United States Patent
Bynum et al.

(10) Patent No.: US 10,604,706 B2
(45) Date of Patent: Mar. 31, 2020

(54) FUEL-CELL REACTOR

(71) Applicant: Portable GTL Systems, LLC, Dallas, TX (US)

(72) Inventors: Roy A. Bynum, Sachse, TX (US); Kevin M. Henson, Garland, TX (US)

(73) Assignee: PORTABLE GTL SYSTEMS, LLC, Dallas, TX (US)

( * ) Notice: Subject to any disclaimer, the term of this patent is extended or adjusted under 35 U.S.C. 154(b) by 0 days.

(21) Appl. No.: 16/156,743

(22) Filed: Oct. 10, 2018

(65) Prior Publication Data
US 2019/0040322 A1   Feb. 7, 2019

Related U.S. Application Data

(63) Continuation of application No. 15/046,345, filed on Feb. 17, 2016, now abandoned.

(60) Provisional application No. 62/116,991, filed on Feb. 17, 2015.

(51) Int. Cl.
*C01B 3/34* (2006.01)
*C10G 2/00* (2006.01)

(52) U.S. Cl.
CPC .............. *C10G 2/34* (2013.01); *C01B 3/34* (2013.01); *C01B 2203/0233* (2013.01); *C01B 2203/062* (2013.01); *C01B 2203/1241* (2013.01); *C10G 2300/70* (2013.01)

(58) Field of Classification Search
CPC ................................. C10G 2/34; C01B 3/34
USPC ........................................................ 422/187
See application file for complete search history.

(56) References Cited

U.S. PATENT DOCUMENTS

| | | | | |
|---|---|---|---|---|
| 2,566,159 | A * | 8/1951 | Beckberger | B01J 8/10 208/122 |
| 3,969,324 | A * | 7/1976 | Berkau | B01J 19/20 526/65 |
| 4,681,603 | A * | 7/1987 | Spangler | C01B 3/34 95/166 |
| 4,743,517 | A * | 5/1988 | Cohen | H01M 8/0612 429/425 |
| 8,574,501 | B1 * | 11/2013 | Greer | B01J 19/0046 422/129 |
| 2012/0277329 | A1 * | 11/2012 | Galloway | C10G 2/30 518/704 |

(Continued)

FOREIGN PATENT DOCUMENTS

CN     201634191 U   * 11/2010   ............ B65G 33/14

OTHER PUBLICATIONS

Machine translation for CN201634191U—Apr. 25, 2019.*

*Primary Examiner* — Huy Tram Nguyen
(74) *Attorney, Agent, or Firm* — Conley Rose, P.C.; Keith C. Rawlins

(57) ABSTRACT

A reactor containing one or more spiral paths adapted to facilitate the reaction of feed stock, syn-gas with a catalyst or catalysts, for the purpose of synthesizing multiple longer chains of hydrocarbons where there the reactor is further adapted to manage the inflow of syn-gas feed stock, the outflow of hydrocarbon products the recycling of catalysts to ensure minimal maintenance interruptions, where the solid catalyst nodules are of a geometry and size contusive to fluid like movement through the reactor and through a regenerative catalysts management operation. The unit operates with minimal support infrastructure.

14 Claims, 10 Drawing Sheets

(56) References Cited

U.S. PATENT DOCUMENTS

2013/0213256 A1* 8/2013 McAlister ............ B01J 12/007
                                                    105/62.1

* cited by examiner

FUEL-CELL REACTOR

CROSS-REFERENCE TO RELATED APPLICATIONS

This application claims priority to earlier filed provisional patent application No. 62/116,991 entitled "Compact Dry FT Reactor and Maintenance Ports in an FT Reactor", which was filed on Feb. 17, 2015, the entire contents of which are hereby incorporated by reference.

TECHNICAL FIELD OF THE APPLICATION

This application relates to a hydrocarbon fuel cells and related production of hydrocarbon fuels via a reactor.

BACKGROUND OF THE APPLICATION

The Fischer-Tropsch (FT) process has been known and has been improved and realized in many different ways. The vast majority of the current technology development is in the production of Synthesis Gas (CO+H2) (Syn-Gas) from various hydrocarbon sources such as sugar cane sap or animal fat, etc. FT reactor design has not greatly changed. All of these design concepts incorporate some form of straight flow of Syn-Gas from the inlet of the FT reactor to the outlet of the FT products into an exhaust pipe of some sort. Several of the FT reactor designs incorporate vertical straight reactor tubes in which the Syn-Gas is caused to flow across a catalyst to produce the FT reactions, producing the desired hydrocarbon products. The horizontal FT reactor design utilizes straight reactor tubes with the catalyst fixed within the reactor tubes. A fixed bed type of reactor has the catalyst held loosely fixed while the Syn-Gas moves upward through the gaps between the catalyst. A slurry type of FT reactor utilizes straight reactor tubes in a vertical orientation, often with an upward movement of the slurry which also contains the Syn-Gas and catalyst for the FT reaction, with the slurry and catalyst being recycled through the reactor. Also, because of the need to maintain consistent Syn-Gas bubble size, most FT reactor designs, particularly the slurry type reactors need to be highly pressurized.

Because types of hydrocarbon products produced by the FT reactions are based in part of the amount of time that the Syn-Gas is exposed to the catalyst within the reactor tubes, the effective length of the reactor tubes tend to be fairly long, often 3 meters or longer, which makes the overall length of the FT reactor even longer. Both the horizontal and vertical tube FT reactor can have anywhere from one to many reactor tubes, which can also effect the outside width or diameter of the FT reactor, causing current technology FT reactors to have a minimum large size.

Broadly, current technology FT synthesis facilities tend to come in two scales. The first is desk top units designed to merely demonstrate the principal to chemical engineering students. Table top units cannot produce enough liquid hydrocarbons to be significant. The second type of FT facility varies from taking up medium sized buildings to sprawling across many acres. One of the determining factors of the size of the FT facilities are the sizes of the FT reactors. These large commercial units are very expensive and are designed for installation in a particular location.

SUMMARY OF THE APPLICATION

One example embodiment may provide a reactor containing one or more spiral paths adapted to facilitate the reaction of feed stock, syn-gas with a catalyst or catalysts, for the purpose of synthesizing multiple longer chains of hydrocarbons where there the reactor is further adapted to manage the inflow of syn-gas feed stock, the outflow of hydrocarbon products the recycling of catalysts to ensure minimal maintenance interruptions, where the solid catalyst nodules are of a geometry and size contusive to fluid like movement through the reactor and through a regenerative catalysts management operation. The unit operates with minimal support infrastructure.

DETAILED DESCRIPTION OF THE APPLICATION

Figure 1:
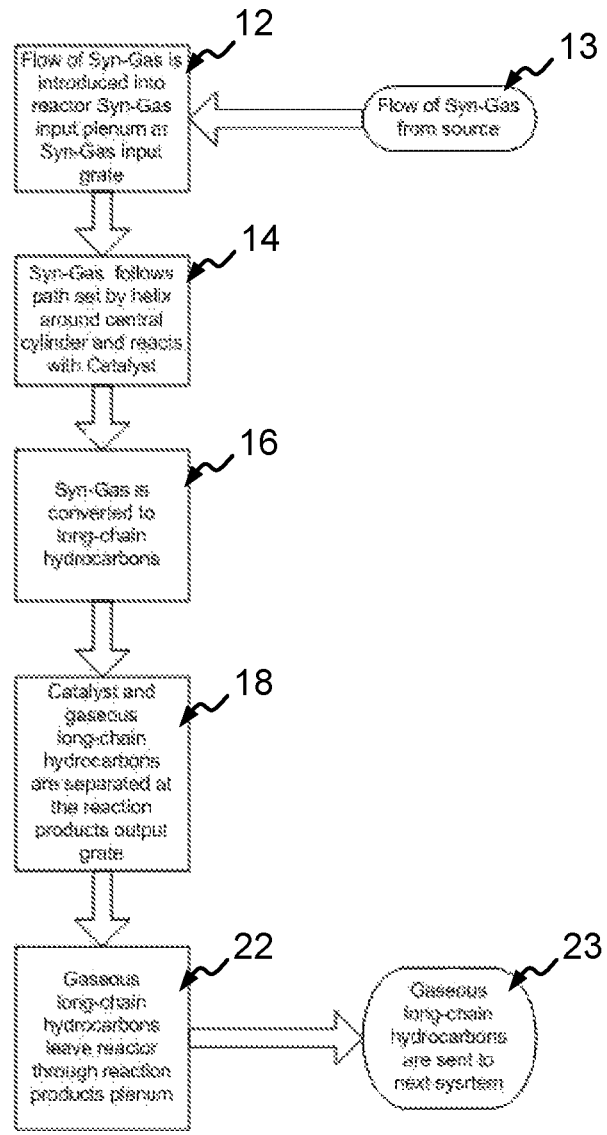
FIG. 1 illustrates a flow diagram of gas reaction in the reactor according to example embodiments.

It will be readily understood that the components of the present application, as generally described and illustrated in the figures herein, may be arranged and designed in a wide variety of different configurations. Thus, the following detailed description of the embodiments of a method, apparatus, and system, as represented in the attached figures, is not intended to limit the scope of the application as claimed, but is merely representative of selected embodiments of the application.

The features, structures, or characteristics of the application described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present application. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

The present disclosure relates generally to the field of hydrocarbon fuel production and specifically to the design and implementation of a reactor, such as a Fischer-Tropsch reactor, for the production of commercial liquid hydrocarbons (e.g., crude, gasoline, diesel, jet fuel), from natural gas or other feedstock by using a catalyst to cause an exothermic reaction that builds the desired long chain hydrocarbons from a Synthesis Gas.

This application describes a novel design for a Fischer-Tropsch (FT) reactor that incorporates helical surface surrounding a central cylinder or shaft within a cylindrical reactor. The helical path around the central cylinder or shaft greatly increases the effective path length of Syn-Gas through catalyst for the FT reaction relative to the required length or size of the FT reactor. The helical surface can also be rotated to provide for continuous movement of the catalyst to provide for refreshing or cleaning the catalyst without having to shut down the reactor. This is a novel feature not found in other FT reactors.

In one embodiment, the instant application includes a concept of the path of the movement of Syn-Gas that is changed to a sloped spiral flow, using a helical surface surrounding a central cylinder or shaft. The catalyst is contained in the volume of the reactor in the space between the surfaces of the helix within the reactor. The catalyst can be loosely filling the reactor volume or it can be affixed to the upper and lower surface material that makes up the helix within the reactor. The central cylinder or shaft of the helical surface can be hollow to allow for coolant to flow through the central cylinder for additional cooling of the reactor.

The helical surface surrounding the central cylinder or shaft can be rotating to provide for movement of a loosely filled catalyst, allowing the catalyst to be cycled through the reactor and be refreshed on a regular or as-needed basis. A loosely filled catalyst would be in the form of small pellets, balls, pebbles, or granules to allow for the movement of the catalyst.

Small loosely filled catalyst of that form would also provide a high surface area to volume of the catalyst within the reactor, allowing the Syn-Gas to contact almost the entire surface of the catalyst material, except where the catalyst material touches itself and the surface of the inside of the reactor allowing for a relatively high rate of conversion of Syn-Gas to liquid hydrocarbons compared to other FT reactor designs.

The concept of cycling the catalyst through the reactor also provides for a mechanism to be used to pull damaged or "dirty" catalyst, catalyst that has been contaminated by any number of sources, out of the FT reactor and introduce undamaged or "clean", uncontaminated catalyst into the FT reactor and the Syn-Gas flow. By having a method of cycling dirty catalyst and replacing it with clean catalyst while the FT reactor is operational, the need to shut down the reactor to clean out and replace the catalyst in the reactor is avoided.

Much has been written about the use of various catalysts, including cobalt, various iron alloys and new ceramic materials that emulate the metal catalysts. The choice of catalyst will have bearing on the effective length of the reactor tubes, the temperature, and flow rate of Syn-Gas into the FT reactor.

In addition to the choice of catalyst, the design of the FT reactor has several design and implementation considerations. The specifics of these design considerations can vary and also have interlinking effects on the process within the FT reactor and thus can have a major affect on a specific implementation of a FT reactor of the instant design. These considerations include at least one of: 1. The desired effective length of the path of the Syn-Gas through the catalyst in the reactor, 2. The slope of the or angle of the helical surface within the reactor, 3. The inside diameter of the reactor outside cylinder or pressure shell, 4. The outside diameter of the inside or central cylinder of the reactor, 5. The size or diameter of the catalyst material, 6. The temperature and flow rate of the Syn-Gas into the reactor tube, 7. The pressure differential of the Syn-Gas between the input of the reactor tube and the output of the exhaust tube at the catalyst output product separator, 8. The desired temperature of the catalyst spheres, Syn-Gas, and hydrocarbon products within the reactor tube, 9. The design and method of cooling of the reactor.

The angle of the helix blades relative to normal of the vertical side of the inside cylinder can also be a consideration. An implementation of the instant application would have the helix blade at normal to the vertical side of the inside cylinder. Other implementations could have the angle of the helix blade at less than normal, or sloping upward or inward to the central cylinder, or at greater than normal, sloping downward or outward from the central cylinder. All these design considerations will have an effect on the operation and movement of catalyst within the reactor.

FIG. 1 illustrates a flow diagram of gas reaction in the reactor according to example embodiments. This is a high level flowchart of the process of Syn-Gas and FT reaction products along with refresh of the catalyst through the reactor. Referring to FIG. 1, a flow of Syn-Gas is introduced into the reactor Syn-Gas input plenum at operation 12 (see FIG. 2), as the flow of Syn-Gas is receiver 13, the Syn-Gas follows a path set by the helix around the central cylinder 400 and reacts with the catalyst 420 at operation 14. The Syn-Gas is converted to a long-chain hydrocarbon at operation 16. The Catalyst and gaseous long-chain hydrocarbons are separated at the reaction products output grate at operation 18. The gaseous long-chain hydrocarbons leave the reactor through a reaction products plenum at operation 22. The gaseous long-chain hydrocarbons are sent to a next level in the system configuration at operation 23.

Figure 2:
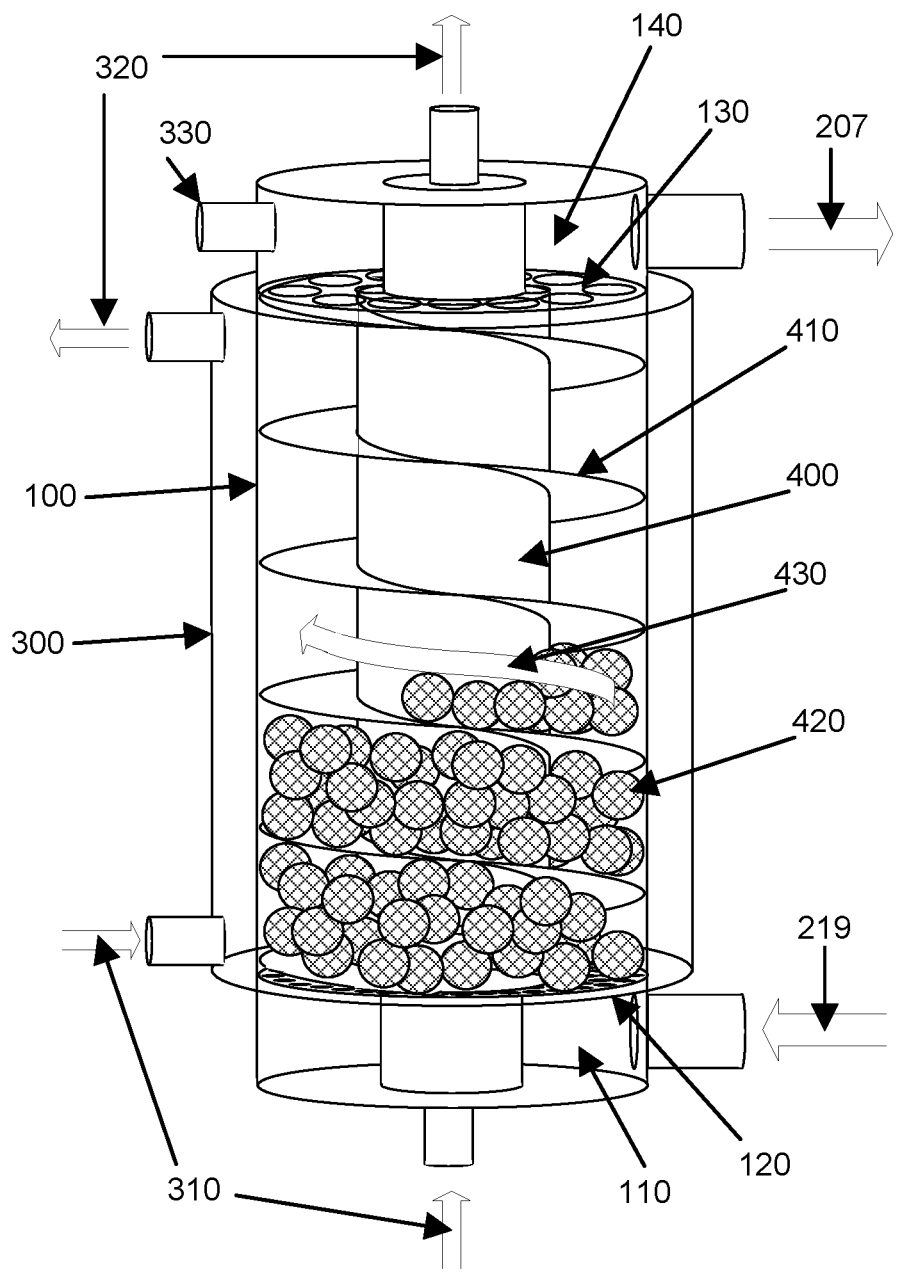
FIG. 2 illustrates an example reactor configuration according to example embodiments.

FIG. 2 illustrates an example reactor configuration according to example embodiments. This illustration provides a shortened FT reactor of the instant application. The length, or height of the reactor can be any size based on the operational path length requirements based on the types and lengths of hydrocarbon chains desired from production from the FT reactions in an actual implementation of this instant application. This illustration only shows the reactor to be partially filled with catalyst to show specific features of this implementation, but not all detail items that would be in a FT reactor of this instant application. Like all FT reactors, it has a pressure shell (100) that also often acts as the outside shell for the reactor itself. The illustration shows a Syn-Gas input plenum (110), a Syn-Gas input grate (120), a reaction products output grate (130) and a reaction products output plenum (140). In operation, Syn-Gas enters the reactor into the Syn-Gas input plenum and reaction products exits the reactor through the reaction products output plenum. This implementation also has a coolant jacket (300) that surrounds the pressure shell. Coolant enters the reactor (310) and exits the reactor (320) from bottom to top in this implementation illustration. In addition to the other features showing in the illustration of this implementation, this reactor has a central or inside cylinder (400) that serves two purposes. In addition to acting as a coolant heat sink, this cylinder forms the support structure for a helix (410) that wraps around the central cylinder, inside the reactor pressure shell, progressing from the bottom to the top of the reactor.

The helix supports the catalyst (420) and forms the basis for Syn-Gas and reaction products to follow the path of the helix, wrapping around the central cylinder (430). The reactor is only partially filled with catalyst to show these additional features. In the operational implementation of this reactor, it would be filled with catalyst from the Syn-Gas input grate to the reaction products output grate. As shown by the way that the helix wraps around the central cylinder, the path length for the Syn-Gas and reaction products is greatly increased over a reactor of the same height or length. This illustration does not include several of the detail items that would normally be part of an implementation of this instant application. For implementations of this instant applications where the helix does not rotate, a maintenance port can be implemented at each end of the reactor chamber, functioning to allow the removal and replacement of the catalyst without dismantling the reactor. Such items as section flanges, seals and bolts are also not shown on this illustration. Bearings and rotation seals that would also be part of the version of this instant application that has the helix and central cylinder rotating within the reactor, are also not shown here.

This illustration is based on the synthesis of liquid fuels. The pressure within the pressure shell of the reactor of this illustration would be between 10 and 20 Bar, requiring the outer cylinder of this reactor to be able to handle that level of pressure without failure. The pressure shell also forms the outer cylinder of the helix path containment. The average pressure and pressure gradient within the reactor will be part of the operational parameters of the reactor based on the desired reaction products, with lower pressure tending toward short chains, while higher pressures tending toward long hydrocarbon chains.

Referring again to FIG. 2, 110 is a Syn-Gas input plenum. All of the "dry" operational FT reactors have a Syn-Gas input plenum of some sort, often using various labels. The input plenum acts to distribute the Syn-Gas somewhat evenly within the point or points where the Syn-Gas is initially exposed to the catalyst. In this illustration, the input to the input plenum is at an angle to the axis of the reactor, thus producing a level of vortex to the Syn-Gas within the plenum.

120 is the Syn-Gas input grate. The Syn-Gas input grate 120 performs several functions. First, it functions to suspend the catalyst within the reactor. It provides a "floor" for the helix. As an open grate, it allows the Syn-Gas from the input plenum to enter the reactor and have contact with the catalyst within the reactor. The size of the openings within the grate will be part of the design considerations of the reactor, needing to be smaller than the catalyst and shaped so as not to cause jamming of the helix rotation in implementations where that could be an issue. In implementations where the helix does not rotate, the input grate may be shaped so as to present an angle of the entry of the Syn-Gas to the helix path that is direct helix path. 130 is a reaction products output grate. The reaction products output grate functions to prevent catalyst from entering the reaction products output plenum and then possibly leaving the reactor along with the reaction products. The size of the openings will be small enough to prevent catalyst from traveling though the grate. The size and shape of the openings in the output grate will also depend on the desire for additional back pressure within the reactor so as to increase the average operational pressure of the reactor.

140 is a reaction products output plenum. The reaction products output plenum 140 is a space to collect the FT reaction products before they leave the reactor. 219 is an input to the reactor where the Syn-Gas enters the reactor. In this illustration of this implementation of this instant application, Syn-Gas enters the reactor at the bottom of the reactor. 207 is where the reaction products exit the reactor. In this illustration of this implementation of this instant application, reaction products from the FT reactions within the reactor exit the reactor at the top of the reactor.

300 is a coolant jacket. FT reactions are exothermic, producing heat as part of the reaction process. While certain high temperatures are desired within a FT reactor, left unchecked, this exothermic process would cause excessive heat, carbonizing the Syn-Gas and possibly damaging the reactor and reducing operational safety. To mitigate and carry off this excessive heat, coolants of various kinds are used. To isolate the gaseous environment of the FT reactor core in this illustration of this implementation of this instant application, the coolant is contained in an outer shell of the reactor, outside the pressure vessel outer cylinder. Vanes within the coolant jacket to maintain mixing of the coolant temperatures and to better maintain contact of the coolant with the outer cylinder are not shown. 310 is where coolant enters the reactor at a bottom portion of the reactor. In this illustration of this implementation of this instant application, the coolant enters the reactor at the bottom of the reactor. Because of the tendency of the Syn-Gas to generate higher levels of heat at the entrance of the Syn-Gas to the reactor, the cooler coolant is introduced at the point where that higher heat levels are generated. This not only tends to prevent excessive heating at this point in the reactor, it will also increase the temperature of the coolant and redistribute the overall temperature to portions of the reactor that are not producing excessive levels of heat, tending to maintain a more average temperature within the reactor as the Syn-Gas and reaction products travel through the reactor. 320 is where coolant exits the reactor at a top of reactor. In this illustration of this implementation of this instant application, the coolant exits the reactor at the top of the reactor. Other implementations of this instant application may have several locations along the coolant jacket where coolant exits the reactor to prevent the coolant from picking up excessive heat and temperature, in order to maintain the desired operational temperatures within the reactor.

330 is the catalyst exchange port. This includes one or more openings with gas seals allows a catalyst to be moved out of or into the reactor facilitating cleaning and regeneration of the catalyst. 400 is a central or inside cylinder a central cylinder is used to anchor and hold the helix. That is also the function of the central cylinder in this instant application. The inside of the helix blade or blades are directly attached to the central cylinder and spiral around the central cylinder. When the central cylinder is rotated, the helix blade or blades are also rotated, and thus the helix is rotated within the reactor. In addition to acting to hold the helix along the central axis of the reactor, the central cylinder can act to provide an additional coolant path through the reactor. With the helix blades directly attached to the central, by having the central cylinder act as an additional heat sink for the FT reaction process, the effective contact area for the catalyst to a cooling surface is greatly increased within the reactor. Unlike the coolant jacket, the coolant can only be input and exit for the coolant can only be at the axis ends of the central cylinder. Special seals that can seal the coolant and hot gases of the reaction process are required. These special seals have additional requirements when the central cylinder is rotating within the reactor.

410 is the helix, this structure provides for lifting a fluid or fluid acting solid granular material, or used as a turbine for generating electricity from falling water increasing the effective flow path length within a compact FT reactor. The helix wraps around the central cylinder in a continuous blade at an ascending angle from top to bottom of the reactor. The angle of the helix relative to the vertical length of the reactor, in conjunction to the number of times that the helix wraps around the central cylinder, and the dimension between the central cylinder and the outer cylinder will determine the average effective path length within the reactor. In this illustration of this implementation there is only one helix blade spiraling round the central cylinder. In this illustration of this implementation, the helix blade is flat and extends out from the central cylinder at a 90 degree angle (normal) to the vertical side of the central cylinder. In this implementation the helix blade extends from the central cylinder to close proximity to and/or touching the outer cylinder. This type of helix blade configuration may prevent Syn-Gas flowing around the edges of the helix and failing to maintain the desired flow path. In addition to providing an extended flow path, the helix also provides additional effectiveness in cooling the catalyst. If the space dimension between the central cylinder and the outer cylinder is a nominal double the size of the catalyst, the catalyst will be touching at least two, if not three heat conductive surfaces. Additionally, in implementations where the helix is moving, the intra space between the catalyst is greatly reduced.

420 is the catalyst. This illustration shows the catalyst in the form of a relatively large round shape. The actual catalyst used in most implementations of this instant application will be round because of the rolling ability of round versus other shapes. This illustration shows the catalyst to be loosely filled, similar to what is normally seen in what is known as "pebble bed" reactors. This type of loose fill will be seen in the implementations of this instant application that do not have the helix rotating. The fill ratio of catalyst volume to intra-space volume will be close to 50%. In implementations of this application where the helix is rotating, the fill pattern of round catalyst varies. Depending on the angle of the helix blade relative to the vertical side of the central cylinder, the round catalyst reorganizes into a densely packed structured matrix. The catalyst at the outer cylinder tend to roll up the outer edge of the helix blade. If a space is left between the top of the helix and the reaction products output grate, the catalyst at the outside of the helix blade will tend to fall inward to the inside of the helix blade next to the central cylinder. When the catalyst falls inward, it also forms a densely packed matrix, only rolling downward toward the bottom of the reactor. By the catalyst rolling up the outer side of the helix and then rolling down the inner side of the helix, the catalyst is constantly being rotated. The fill ratio of catalyst volume to intra space volume will much greater than 50% for implementations where the helix is rotating. The Syn-Gas flow back pressure will be much greater for implementations where the helix is rotating within the reactor.

By constantly rotating the catalyst upward and then downward, the condition of the catalyst can be maintained at a nominal level during the operation of the reactor for a greater length of time. Additionally, the catalyst that is at the bottom of the reactor, nearest the Syn-Gas input grate, will be at a somewhat reduced effectiveness because it was rotated from the upward portion of the reactor. This reduced effectiveness will tend to reduce the tendency of the Syn-Gas to flare to very high temperatures, causing carbonization, when it first contacts the catalyst at the Syn-Gas input grate.

Although it is not shown in this illustration of FIG. 2, a mechanism can be implemented where the catalyst that is rolling up the outer edge of the helix can be pushed up to a mechanism that evaluates the condition of the catalyst. If the catalyst is considered to be in a "clean" condition, it can be allowed to go back into the inner edge of the helix. If the catalyst is not "clean" or is contaminated in some way, it can be removed and replaced with a "clean" catalyst.

430 is the Syn-Gas and reaction products follow the path of the helix. The primary reason for the helix design of this instant application is to extend the effective path length of the reactor relative to the actual overall length or size of the reactor. Path length through a FT reactor, based on the type of catalyst and design of the reactor is on of the factors that greatly determines the type of reaction products that are produced by the FT reactor. Short path lengths tend to produce short chain hydrocarbons while long path lengths tend to produce long chain hydrocarbons. In gas to liquid synthesis facilities that are built to small dimensional and weight requirements, large reactor with long straight line reaction paths are not useable. A FT reactor that is compact in size and weight relative the effective path length of the FT reactions is required. By using a helix to define the reaction path, the path length is effectively "squeezed" like a spring. By increasing the angle of the helix relative to the long axis of the reactor, the effective path length is increased. By increasing the angle of the helix, the effective cross sectional area of reaction path is converted to increased effective path length for any given size reactor. The actual or nominal mean path length of implementations of this instant application is difficult to calculate. The nominal path length is greatly effected as to whether the helix rotating. The nature of a loosely filled reactor with somewhat disorganized catalyst, will produce different turbulence and mixing of the Syn-Gas characteristics, as it reacts with the catalyst than a reactor with a rotating helix with densely stacked catalyst. The effective exposed catalyst surface will also be greatly different between a rotating and non-rotating helix. While the desired types of hydrocarbon chains can be estimated for a particular implementation of this instant application, actual results will depend on how the reactor is operated. In this case, this delta between implementation design parameters and operational tuning is similar to other FT reactor designs and implementations.

Any implementation of the reactor would also include a number of other components. Such things as piping flanges and seals, gas vapor seals, fluid seals, rotational seals, and other components are generally commercially available products and are often available without additional discussion. The catalysts exchange can be performed regardless of whether the helix is being turned or is stationary. Maintenance port(s) in the reactor chamber may be added. These can be at both ends, at opposite sides of one or the other end or any other convenient geometry for ensuring the proper movement of the catalyst, which will allow the catalyst to be removed from the reactor without having to dismantle the reactor. Where the input grate is normal to the angle of the helix blade or blades, the maintenance port at the Syn-Gas input may be implemented at the point where the input grate meets the lower edge of the helix blade or blades.

Figure 3:
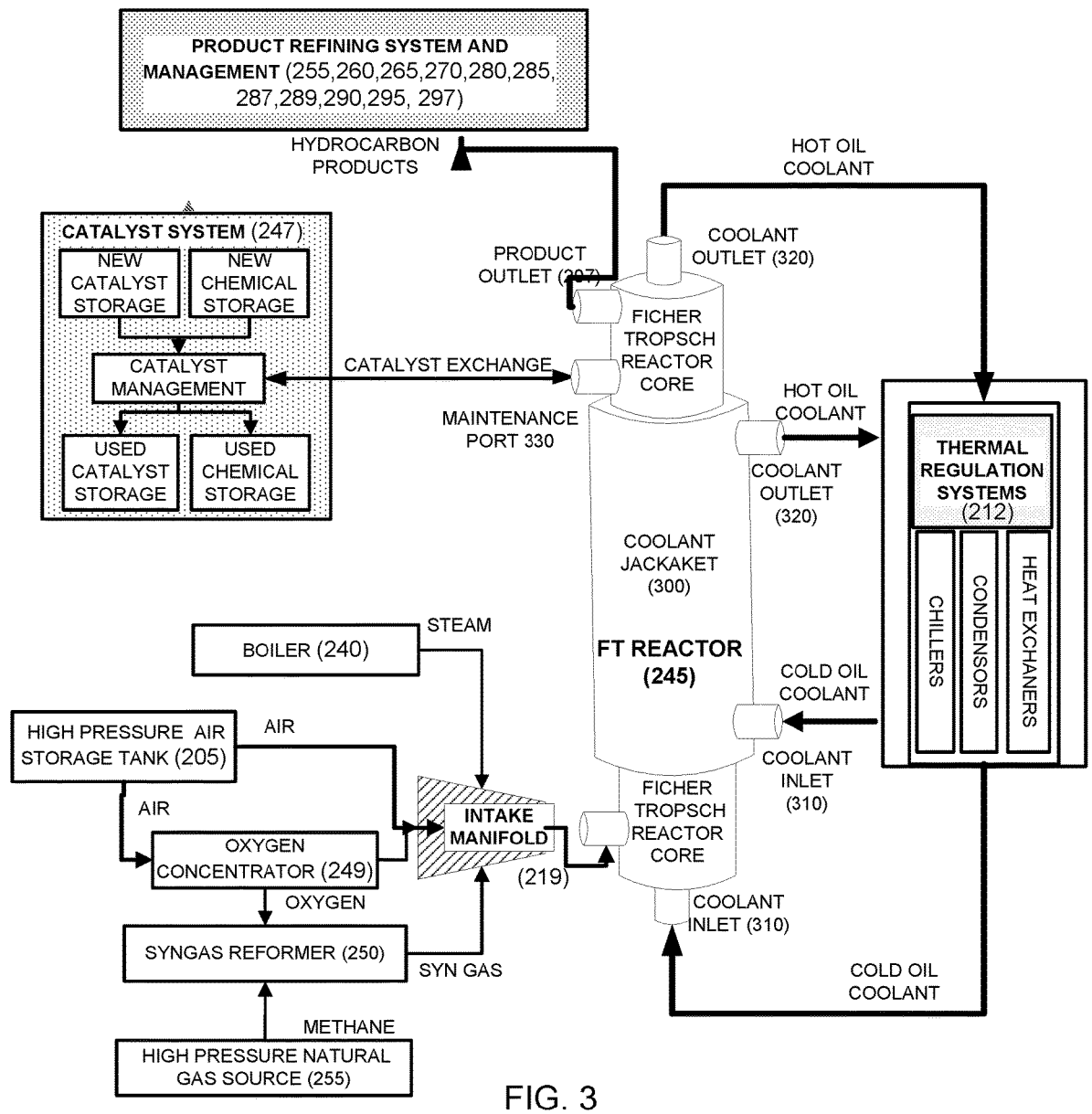
FIG. 3 illustrates a system diagram of the reactor operating within an operating environment according to example embodiments.

FIG. 3 illustrates a system diagram of the reactor operating within an operating environment according to example embodiments. Referring to FIG. 3, the reactor of FIG. 2 is shown within the context of the subsystems around it. Including the flow of inputs and outputs. The air tank 205 provides a standard pressure vessel for holding air with the contaminants removed and feed it into the various components at controlled rates. The air tank receives non-contaminated air from the air intake and cleaning system and outputs the pressurized non-contaminated air primarily to the boiler (240) and the multi-fuel generator.

The thermal regulations system 212 is a system of heat exchanges, condensers and chillers regulates the flow of thermal energy around the system. Waste heat from some processes is used to preheat reactants for others. The natural gas tank 255 provides a standard pressure vessel for holding natural gas that has had contaminants removed and feed it into the various components and controlled rates. The natural gas high pressure storage tank receives pressurized natural gas from an input compressor and sends the pressurized natural gas to the SynGas reformer (250), the multi-fuel generator and the boiler (240).

The boiler 240 produces high temperature, high pressure steam for various stages in the synthesis process. The boiler receives water from a water storage tank and outputs steam to the SynGas reformer and possibly other functional units within the system unit. The heat energy is produced by burning natural gas received from the natural gas high pressure storage tank. Waste heat from the multi-fuel generator may also be used as a heat energy source for the boiler.

A Fischer-Tropsch reactor 245 can have any of many configurations suitable for the Fischer-Tropsch process of converting "SynGas" (CO+H2) into long chain hydrocarbons. The reactor in this system unit is modular in nature and can have any internal arrangement suitable for the Fischer-Tropsch process. It may also include a system to remove, inspect and reprocess the catalyst onsite. The Fischer-Tropsch reactor receives SynGas from the SynGas reformer (250) and outputs long chain hydrocarbons to the hot separator. An integral cooling jacket and radiators may be added to aid thermal management depending on climate. Thermal energy removed from on stage of this process is used to by heat exchangers.

The catalyst management system 247 receive the catalyst from the FT reactor (245) while it is still in operation. It measures the degree of contamination and uses suitable chemical and mechanical means to renew the surface of the catalyst, re-inspects it and re inserts it into the reactor without costly down time. Catalyst to be regenerated is automatically replaced with fresh catalyst form an onboard supply and the worn catalyst and used chemicals are retained for latter reprocessing or disposal. Depending on the catalytic activity and desired product the enrichment of oxygen from the concentrator 249 within the reactor and or reformer may be desirable. Oxygen concentrator of various types are available.

The SynGas reformer 250 is modular in nature and can have any internal arrangement (i.e. steam methane, plasma, or arc discharge) suitable for converting gaseous hydrocarbons (methane, ethane, propane, butane mixtures) into "syngas" (CO+H2). The SynGas reformer receives natural gas from the natural gas high pressure storage tank (255) and outputs the SynGas to the Fischer-Tropsch reactor (245). Depending on the technology used within the SynGas reformer, it may also receive high-pressure steam from the boiler (240). Additionally, the syngas reactor or FT reactor may be unitary or many segmented to accommodate the necessary flow rate and volume.

A few genericized sub-systems are described with reference to the components 255-297 in the refining system of FIG. 3. For example, the hot separator 255 is modular in nature and can have any internal arrangement suitable for separating liquid and gaseous down-stream hydrocarbon products at high temperatures and pressures. The cold separator 260 is modular in nature and can have any internal arrangement suitable for separating liquid and gaseous down-stream hydrocarbon products at low temperatures and high pressures. The hydro cracker 265 is modular in nature and can have any internal arrangement suitable for breaking down and separating any hydrocarbon chains that are too long or "waxy" for inclusion in the final product. The hydro treatment unit 270 receives non-potable water from the hydro reclaim unit (280) and sends potable water to the water storage tank. A multi-fuel generator is modular in nature and can have any internal arrangement suitable to for converting gaseous hydrocarbons into mechanical and electrical energy via internal combustion. The arrangement of an aero-derived multi-fuel gas turbine attached to an alternator through a gear-train should produce acceptable results. The waste thermal energy from the exhaust may be captured to preheat water supplied to the boiler.

The hydro reclaim unit 280 is modular in nature and can have any internal arrangement suitable to for removing water from the product mixture so it can be reused, and the final fuel product will be contamination free. The distillation unit 285 is modular in nature and can have any internal arrangement suitable to for performing fractional distillation and separation of hydrocarbon products for final blending and output. The fuel testing 287 and blending unit 289 test the length of the hydrocarbon chains produced by the Fischer-Tropsch reactor (245) to verify that they are correct for the desired fuel blend to be produced by the system unit, and then blend those desired length hydrocarbons to the correct ration for the desired fuel blend.

The main fuel tank 290 is modular in nature and can have any internal arrangement suitable to for containing the primary hydrocarbon product. The tertiary tank array 295 is modular in nature and can have any internal arrangement suitable to for containing the gaseous/liquid mixed hydrocarbon products that are of less interest. The secondary fuel tank 297 is modular in nature and can have any internal arrangement suitable to for containing the secondary hydrocarbon products of interest.

One example embodiment may include a Fischer-Tropsch reactor in the form of a cylinder with a spiral helical surface around a central cylinder or shaft the entire length of the reactor cylinder, where the catalyst used for the Fischer-Tropsch reaction is loosely filled the entire length of the reactor cylinder, where Syn-Gas enters the reactor at one end and Fischer-Tropsch reaction products leave the reactor at the other end, where the angle of the helical surface provides a spiral path for the Syn-Gas and reaction products as they move through the reactor, where the spiral path greatly increases the effective length of the Syn-Gas and reaction products compared the overall length of the reactor cylinder, where the central cylinder and the spiral helical surface around the central cylinder rotates to move the catalyst within the reactor for the purpose of cycling the catalyst through the reactor to be able to refresh the catalyst without requiring the shutdown of the reactor for maintenance purposes, where coolant is contained in a coolant jacket surrounding the reactor cylinder.

Another example embodiment may include a Fischer-Tropsch reactor in the form of a cylinder with a spiral helical surface around a central cylinder or shaft the entire length of the reactor cylinder, where the catalyst used for the Fischer-Tropsch reaction is loosely filled the entire length of the reactor cylinder, where Syn-Gas enters the reactor at one end and Fischer-Tropsch reaction products leave the reactor at the other end, where the angle of the helical surface provides a spiral path for the Syn-Gas and reaction products as they move through the reactor, where the spiral path greatly increases the effective length of the Syn-Gas and reaction products compared the overall length of the reactor cylinder, where the central cylinder and the spiral helical surface around the central cylinder rotates to move the catalyst within the reactor for the purpose of cycling the catalyst through the reactor to be able to refresh the catalyst without requiring the shutdown of the reactor for maintenance purposes, where coolant is contained in a coolant jacket surrounding the reactor cylinder, where there is a mechanism to evaluate the condition of the catalyst as it is moved to the top of the reactor for the purpose of returning it to the reactor or removing it from the reactor and replacing it with another catalyst.

Another example embodiment may include a Fischer-Tropsch reactor in the form of a cylinder with a spiral helical surface around a central cylinder or shaft less than the entire length of the reactor cylinder, where the catalyst used for the Fischer-Tropsch reaction is loosely filled the entire length of the reactor cylinder, where Syn-Gas enters the reactor at one end and Fischer-Tropsch reaction products leave the reactor at the other end, where the angle of the helical surface provides a spiral path for the Syn-Gas and reaction products as they move through the reactor, where the spiral path greatly increases the effective length of the Syn-Gas and reaction products compared the overall length of the reactor cylinder, where the central cylinder and the spiral helical surface around the central cylinder rotates to move the catalyst within the reactor for the purpose of cycling the catalyst through the reactor to be able to refresh the catalyst without requiring the shutdown of the reactor for maintenance purposes, where coolant is contained in a coolant jacket surrounding the reactor cylinder.

Another example embodiment may include a Fischer-Tropsch reactor in the form of a cylinder with a spiral helical surface around a central cylinder or shaft less than the entire length of the reactor cylinder, where the catalyst used for the Fischer-Tropsch reaction is loosely filled the entire length of the reactor cylinder, where Syn-Gas enters the reactor at one end and Fischer-Tropsch reaction products leave the reactor at the other end, where the angle of the helical surface provides a spiral path for the Syn-Gas and reaction products as they move through the reactor, where the spiral path greatly increases the effective length of the Syn-Gas and reaction products compared the overall length of the reactor cylinder, where the central cylinder and the spiral helical surface around the central cylinder rotates to move the catalyst within the reactor for the purpose of cycling the catalyst through the reactor to be able to refresh the catalyst without requiring the shutdown of the reactor for maintenance purposes, where coolant is contained in a coolant jacket surrounding the reactor cylinder, where there is a mechanism to evaluate the condition of the catalyst as it is moved to the top of the reactor for the purpose of returning it to the reactor or removing it from the reactor and replacing it with another catalyst.

Another example embodiment may include a Fischer-Tropsch reactor in the form of a cylinder with a spiral helical surface around a central cylinder or shaft the entire length of the reactor cylinder, where the catalyst used for the Fischer-Tropsch reaction is loosely filled the entire length of the reactor cylinder, where Syn-Gas enters the reactor at one end and Fischer-Tropsch reaction products leave the reactor at the other end, where the angle of the helical surface provides a spiral path for the Syn-Gas and reaction products as they move through the reactor, where the spiral path greatly increases the effective length of the Syn-Gas and reaction products compared the overall length of the reactor cylinder, where the spiral helical surface around the central cylinder does not rotate, where coolant is contained in a coolant jacket surrounding the reactor cylinder.

Another example embodiment may include a Fischer-Tropsch reactor in the form of a cylinder with a spiral helical surface around a central cylinder or shaft the entire length of the reactor cylinder, where the catalyst used for the Fischer-Tropsch reaction is loosely filled the entire length of the reactor cylinder, where Syn-Gas enters the reactor at one end and Fischer-Tropsch reaction products leave the reactor at the other end, where the angle of the helical surface provides a spiral path for the Syn-Gas and reaction products as they move through the reactor, where the spiral path greatly increases the effective length of the Syn-Gas and reaction products compared the overall length of the reactor cylinder, where the spiral helical surface around the central cylinder does not rotate, where coolant is contained in a coolant jacket surrounding the reactor cylinder, where a maintenance port is located at each end of the helix within the reactor to allow the catalyst to be removed and replaced without dismantling the reactor, where the maintenance ports are closed during operation of the reactor.

Another example embodiment may include a Fischer-Tropsch reactor in the form of a cylinder with a spiral helical surface around a central cylinder or shaft the entire length of the reactor cylinder, where the catalyst used for the Fischer-Tropsch reaction is attached to the upper and lower surfaces of the helical surface around the central cylinder within the reactor, where Syn-Gas enters the reactor at one end and Fischer-Tropsch reaction products leave the reactor at the other end, where the angle of the helical surface provides a spiral path for the Syn-Gas and reaction products as they move through the reactor, where the spiral path greatly increases the effective length of the Syn-Gas and reaction products compared the overall length of the reactor cylinder, where the spiral helical surface around the central cylinder does not rotate, where coolant is contained in a coolant jacket surrounding the reactor cylinder.

Another example embodiment may include a Fischer-Tropsch reactor in the form of a cylinder with a spiral helical surface around a central cylinder or shaft the entire length of the reactor cylinder, where the catalyst used for the Fischer-Tropsch reaction is attached to the upper and lower surfaces of the helical surface around the central cylinder within the reactor, where Syn-Gas enters the reactor at one end and Fischer-Tropsch reaction products leave the reactor at the other end, where the angle of the helical surface provides a spiral path for the Syn-Gas and reaction products as they move through the reactor, where the spiral path greatly increases the effective length of the Syn-Gas and reaction products compared the overall length of the reactor cylinder, where the spiral helical surface around the central cylinder does not rotate, where coolant is contained in a coolant jacket surrounding the reactor cylinder, where a maintenance port is located at each end of the helix within the reactor to allow the catalyst to be removed and replaced without dismantling the reactor, where the maintenance ports are closed during operation of the reactor.

Another example embodiment may include a Fischer-Tropsch reactor in the form of a cylinder with a spiral helical surface around a central cylinder or shaft the entire length of the reactor cylinder, where the catalyst used for the Fischer-Tropsch reaction is loosely filled the entire length of the reactor cylinder, where Syn-Gas enters the reactor at one end and Fischer-Tropsch reaction products leave the reactor at the other end, where the angle of the helical surface provides a spiral path for the Syn-Gas and reaction products as they move through the reactor, where the spiral path greatly increases the effective length of the Syn-Gas and reaction products compared the overall length of the reactor cylinder, where the spiral helical surface around the central cylinder rotates to move the catalyst within the reactor for the purpose of cycling the catalyst through the reactor to be able to refresh the catalyst without requiring the shutdown of the reactor for maintenance purposes, where coolant is contained in a coolant jacket surrounding the reactor cylinder, where the central cylinder of the helical surface is hollow and coolant is allowed to flow through the hollow cylinder.

Another example embodiment may include a Fischer-Tropsch reactor in the form of a cylinder with a spiral helical surface around a central cylinder or shaft the entire length of the reactor cylinder, where the catalyst used for the Fischer-Tropsch reaction is loosely filled the entire length of the reactor cylinder, where Syn-Gas enters the reactor at one end and Fischer-Tropsch reaction products leave the reactor at the other end, where the angle of the helical surface provides a spiral path for the Syn-Gas and reaction products as they move through the reactor, where the spiral path greatly increases the effective length of the Syn-Gas and reaction products compared the overall length of the reactor cylinder, where the spiral helical surface around the central cylinder rotates to move the catalyst within the reactor for the purpose of cycling the catalyst through the reactor to be able to refresh the catalyst without requiring the shutdown of the reactor for maintenance purposes, where coolant is contained in a coolant jacket surrounding the reactor cylinder, where the central cylinder of the helical surface is hollow and coolant is allowed to flow through the hollow cylinder, where there is a mechanism to evaluate the condition of the catalyst as it is moved to the top of the reactor for the purpose of returning it to the reactor or removing it from the reactor and replacing it with another catalyst.

Another example embodiment may include a Fischer-Tropsch reactor in the form of a cylinder with a spiral helical surface around a central cylinder or shaft less than the entire length of the reactor cylinder, where the catalyst used for the Fischer-Tropsch reaction is loosely filled the entire length of the reactor cylinder, where Syn-Gas enters the reactor at one end and Fischer-Tropsch reaction products leave the reactor at the other end, where the angle of the helical surface provides a spiral path for the Syn-Gas and reaction products as they move through the reactor, where the spiral path greatly increases the effective length of the Syn-Gas and reaction products compared the overall length of the reactor cylinder, where the spiral helical surface around the central cylinder rotates to move the catalyst within the reactor for the purpose of cycling the catalyst through the reactor to be able to refresh the catalyst without requiring the shutdown of the reactor for maintenance purposes, where coolant is contained in a coolant jacket surrounding the reactor cylinder, where the central cylinder of the helical surface is hollow and coolant is allowed to flow through the hollow cylinder.

Another example embodiment may include a Fischer-Tropsch reactor in the form of a cylinder with a spiral helical surface around a central cylinder or shaft less than the entire length of the reactor cylinder, where the catalyst used for the Fischer-Tropsch reaction is loosely filled the entire length of the reactor cylinder, where Syn-Gas enters the reactor at one end and Fischer-Tropsch reaction products leave the reactor at the other end, where the angle of the helical surface provides a spiral path for the Syn-Gas and reaction products as they move through the reactor, where the spiral path greatly increases the effective length of the Syn-Gas and reaction products compared the overall length of the reactor cylinder, where the spiral helical surface around the central cylinder rotates to move the catalyst within the reactor for the purpose of cycling the catalyst through the reactor to be able to refresh the catalyst without requiring the shutdown of the reactor for maintenance purposes, where coolant is contained in a coolant jacket surrounding the reactor cylinder, where the central cylinder of the helical surface is hollow and coolant is allowed to flow through the hollow cylinder, where there is a mechanism to evaluate the condition of the catalyst as it is moved to the top of the reactor for the purpose of returning it to the reactor or removing it from the reactor and replacing it with another catalyst.

Another example embodiment may include a Fischer-Tropsch reactor in the form of a cylinder with a spiral helical surface around a central cylinder or shaft the entire length of the reactor cylinder, where the catalyst used for the Fischer-Tropsch reaction is loosely filled the entire length of the reactor cylinder, where Syn-Gas enters the reactor at one end and Fischer-Tropsch reaction products leave the reactor at the other end, where the angle of the helical surface provides a spiral path for the Syn-Gas and reaction products as they move through the reactor, where the spiral path greatly increases the effective length of the Syn-Gas and reaction products compared the overall length of the reactor cylinder, where the spiral helical surface around the central cylinder does not rotate, where coolant is contained in a coolant jacket surrounding the reactor cylinder, where the central cylinder of the helical surface is hollow and coolant is allowed to flow through the hollow cylinder.

Another example embodiment may include a Fischer-Tropsch reactor in the form of a cylinder with a spiral helical surface around a central cylinder or shaft the entire length of the reactor cylinder, where the catalyst used for the Fischer-Tropsch reaction is loosely filled the entire length of the reactor cylinder, where Syn-Gas enters the reactor at one end and Fischer-Tropsch reaction products leave the reactor at the other end, where the angle of the helical surface provides a spiral path for the Syn-Gas and reaction products as they move through the reactor, where the spiral path greatly increases the effective length of the Syn-Gas and reaction products compared the overall length of the reactor cylinder, where the spiral helical surface around the central cylinder does not rotate, where coolant is contained in a coolant jacket surrounding the reactor cylinder, where the central cylinder of the helical surface is hollow and coolant is allowed to flow through the hollow cylinder, where a maintenance port is located at each end of the helix within the reactor to allow the catalyst to be removed and replaced without dismantling the reactor, where the maintenance ports are closed during operation of the reactor.

Another example embodiment may include a Fischer-Tropsch reactor in the form of a cylinder with a spiral helical surface around a central cylinder or shaft the entire length of the reactor cylinder, where the catalyst used for the Fischer-Tropsch reaction is attached to the upper and lower surfaces of the helical surface around the central cylinder within the reactor, where Syn-Gas enters the reactor at one end and Fischer-Tropsch reaction products leave the reactor at the other end, where the angle of the helical surface provides a spiral path for the Syn-Gas and reaction products as they move through the reactor, where the spiral path greatly increases the effective length of the Syn-Gas and reaction products compared the overall length of the reactor cylinder, where the spiral helical surface around the central cylinder does not rotate, where coolant is contained in a coolant jacket surrounding the reactor cylinder, where the central cylinder of the helical surface is hollow and coolant is allowed to flow through the hollow cylinder.

Another example embodiment may include a Fischer-Tropsch reactor in the form of a cylinder with a spiral helical surface around a central cylinder or shaft the entire length of the reactor cylinder, where the catalyst used for the Fischer-Tropsch reaction is attached to the upper and lower surfaces of the helical surface around the central cylinder within the reactor, where Syn-Gas enters the reactor at one end and Fischer-Tropsch reaction products leave the reactor at the other end, where the angle of the helical surface provides a spiral path for the Syn-Gas and reaction products as they move through the reactor, where the spiral path greatly increases the effective length of the Syn-Gas and reaction products compared the overall length of the reactor cylinder, where the spiral helical surface around the central cylinder does not rotate, where coolant is contained in a coolant jacket surrounding the reactor cylinder, where the central cylinder of the helical surface is hollow and coolant is allowed to flow through the hollow cylinder, where a maintenance port is located at each end of the helix within the reactor to allow the catalyst to be removed and replaced without dismantling the reactor, where the maintenance ports are closed during operation of the reactor.

Another example embodiment may include a Fischer-Tropsch reactor containing one or more spiral paths adapted to facilitate the reaction of feed stock, Syn-gas with a catalyst or catalysts, for the purpose of synthesizing multiple longer chains of hydrocarbons where there the reactor is further adapted to manage the inflow of syn-gas feed stock, the outflow of hydrocarbon products the recycling of catalysts to ensure minimal maintenance interruptions, where the solid catalyst nodules are of a geometry and size contusive to fluid like movement through the reactor and through a regenerative catalysts management system, while the unit is in operation and further adapted to manage the thermal needs of such a unit with minimal support infrastructure.

The geometry of the catalyst path is adapted to increase the contact time between the Syng-Gas and the catalyst. The catalyst is autonomously inspected for degradation and restored to a more efficient function with a catalyst management system adapted to utilize chemical and mechanical techniques to remove contaminants form the catalyst. The catalyst management system autonomously evaluates the effectiveness of the cleaning operation. The catalyst management system substitutes new catalyst for contaminated catalyst if it cannot be adequately cleaned, form an onboard stockpile and retains the contaminated catalyst for future reprocessing or disposal.

The geometry of the helical catalyst paths combined with the rotation of a helical core element, and a circulating solid catalyst to enhance the path length and surface area available for reaction in a compact reactor relative to micro channel, fixed bed, and slurry designs.

The construction of the Fischer-Tropsch reactor may also be made to permit the removal and replacement of loosely filled catalyst from the reactor without having to disassemble or remove the reactor for maintenance purposes. To resolve the adverse effects of catalyst maintenance procedures, a mechanism is needed so that only the catalyst in a FT reactor is removed and replaced, thus reducing the maintenance downtime. The concept of removing only the catalyst requires a different approach to the physical size and shape of the catalyst as well as a different concept to the design of the reactor pressure vessel or tube. At present most, if not all "dry" process FT reactor designs are based on a fixed bed concept. A fixed bed FT reactor holds the catalyst in a fixed position within the reactor in what is called a "bed". Large fixed bed FT reactors also have tubes containing coolant running through the bed of catalyst. A fixed bed FT reactor may only be a small reactor tube with the catalyst fixed within the reactor tube.

A concept of removing only the catalyst without disassembling the reactor requires that the catalyst be loose within the reactor, rather than fixed within the reactor. It is the concept of a loosely filled dry FT reactor, or a "pebble bed" reactor. The walls of a FT reactor are not considered to be a major part of the FT reaction process. In many cases, special coatings are applied to the walls and fixtures with a FT reactor to prevent corrosion from the hot hydrogen of the Syn-Gas flowing trough the reactor. Replacing only catalyst within a reactor will not remove waxy buildup or other contaminants from the walls of a FT reactor. In the process of the catalyst being removed, some of that waxy coating will be scraped off, thus removing some of the thickness of that coating. The remaining waxy build up on the inside walls of the reactor will tend to add a level of corrosion protection, and over time develop a non-reactive polymer layer within the coating.

In addition to the catalyst being loosely filled within the FT reactor, the reactor tube or pressure vessel will require sealable ports to remove the old catalyst and insert new catalyst. The catalyst will also have to be of a shape and size that lends to the removal of the catalyst. That size and shape would also lend itself to the movement of the catalyst within the reactor tube to prevent jams that could restrict the removal of the catalyst. The surface of the catalyst would also need to be hard enough to prevent damage to the surface as the catalyst is being removed and/or inserted.

According to example embodiments, the distinction of a Fischer-Tropsch (FT) reactor that is loosely filled with catalyst instead of a FT reactor that has the catalyst fixed in place within the reactor is also known as a "fixed bed" reactor. Both the fixed bed reactor and the loosely filled reactor operate under relative dry conditions. In addition to the FT reactor in this instant application being loosely filled with catalyst, the reactor is built with ports that allow for the catalyst to be removed and inserted without having to disassemble to reactor either in place or after being removed for maintenance.

Anyone experienced and knowledgeable in the design, implementation, and operation of FT reactors will be able to design and implement a mechanism, device.

Figure 4:
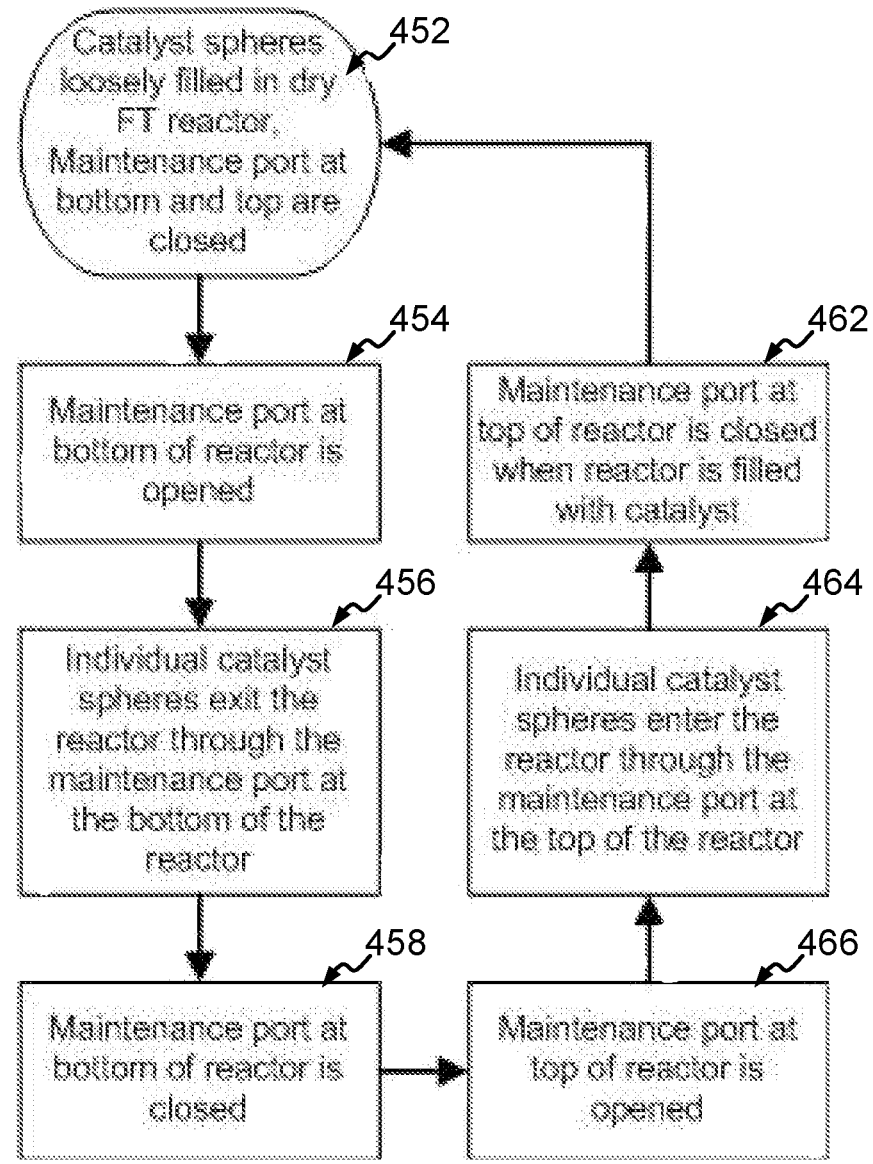
FIG. 4 illustrates a flow diagram of the reactor operating according to example embodiments.

FIG. 4 is a high level flowchart of the process and functions of the mechanism of performing maintenance on the reactor. For example, the catalyst spheres are loosely filled in a dry reactor and the maintenance access port and the bottom and top are in a closed position at operation 452. The maintenance port at the bottom is then opened at operation 454. The catalyst spheres exit the rector through the maintenance port at the bottom of the reactor at operation 456. The maintenance port is then closed at operation 458. The maintenance port at the top is then opened at 466 and the catalyst spheres enter the reactor through the port at the top of the reactor 464. The port is closed and the reactor is filled with the catalyst 462.

Figure 5:
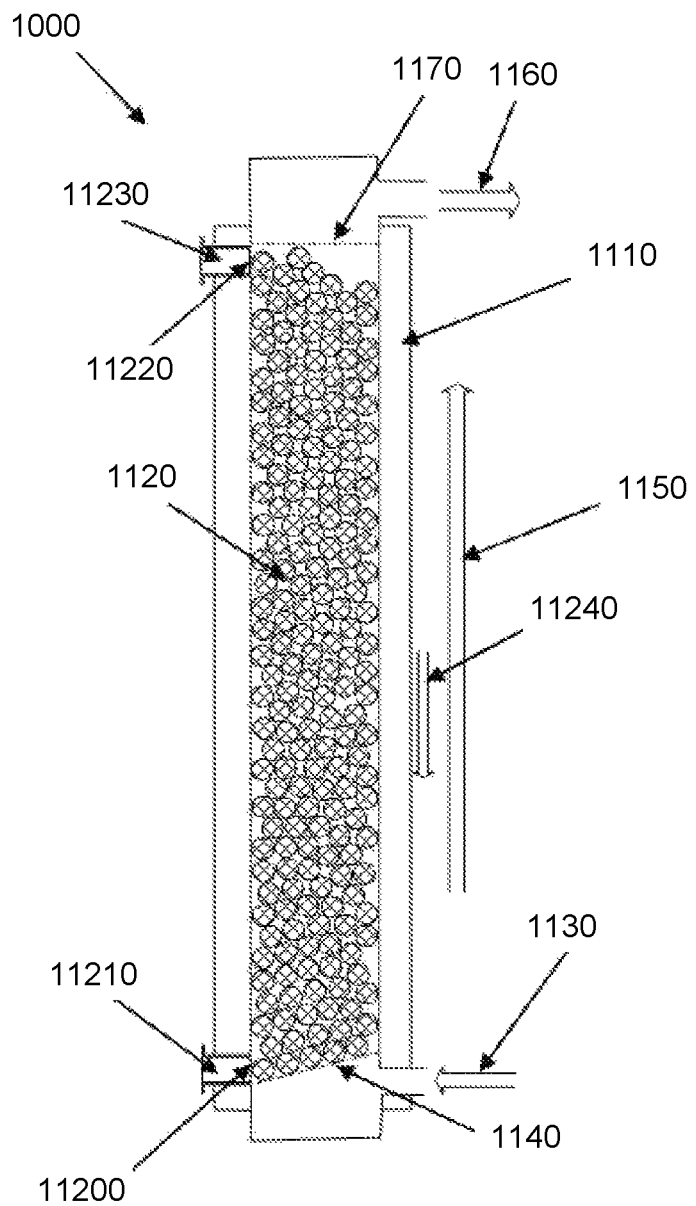
FIG. 5 illustrates a configuration of the chamber of the catalyst spheres according to example embodiments.
Figure 6:
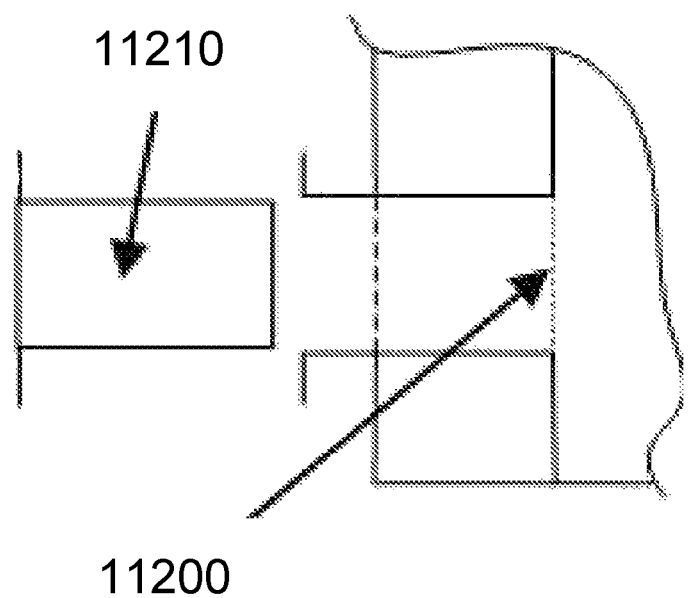
FIG. 6 illustrates a close-up view of the access of the catalysts spheres and other inputs according to example embodiments.

FIG. 5 is a side view of a configuration for a pebble bed. The FT reactor (1000) with a coolant jacket (1110) is loosely filled with catalyst (1120). Syn-Gas (1130) enters the lower end of the FT reactor through a sloping gas screen or grid (1140) which holds the catalyst in place in the reactor. The flow of the Syn-Gas and hydrocarbon products is upward (1150) through the loosely filled catalyst. The gaseous hydrocarbon products exit the FT reactor (1160) through another gas screen or grid (1170) at the top of the FT reactor. A lower maintenance port (11200) at the base of the catalyst filled section of the reactor is plugged with a maintenance port plug (11210) during reactor operation. An upper maintenance port (11220) at the top of the catalyst filled section of the reactor is plugged with a maintenance port plug (11230) during reactor operation. When the reactor is not operating, and is a maintenance cycle, the maintenance port plugs can be removed and the catalyst in the reactor can be allowed to move downward (11240) and out of the reactor at the lower maintenance port, and then be replaced through the upper maintenance port. FIG. 6 is an enlarged view of the lower maintenance port (11200) and the maintenance port plug (11210) as seen in FIG. 5. In this figure, the maintenance port plug has been removed from the maintenance port to show the opening in the reactor which is the maintenance port.

In the example of FIG. 5, 1000 includes a loosely filled pebble bed Fischer-Tropsch (FT) reactor. In a pebble bed reactor, the catalyst loosely fills the reactor with no fixed position for each catalyst within the reactor. Without being fixed within the reactor, the ability to cool each catalyst is somewhat problematic because cooling surfaces cannot be specifically defined and set for each catalyst.

1110 is the coolant jacket. Because the Fischer-Tropsch hydrocarbon synthesis process is exothermic, generating heat, a method of cooling is required for the Syn-Gas, hydrocarbon reaction products, and the catalyst, which is used for the reaction process. In this illustration, the method of cooling is by a coolant jacket surrounding the reactor. 1120 is the catalyst. The catalysts in this illustration of this instant application are round. The catalysts can be of any shape or size based on the ability of the catalyst be moveable within the reactor.

1130 is where the Syn-Gas enters the reactor. In this illustration of this implementation of this instant application, the orientation of the reactor is vertical, with the Syn-Gas entering through a port in the reactor at the lower end of the reactor. Other implementations of this instant application can have non-vertical orientations. 1140 is a sloping gas screen or grid. In this illustration of this implementation of this instant application the catalyst is held in place by a sloping gas screen or grid. The grid serves two purposes. The grid is highly porous to allow Syn-Gas to enter the section of the reactor where the catalyst is located, but not so open as to allow the catalyst to fall though. Because the grid is sloped, it acts to direct the catalyst into the maintenance port when the port is open. Other implementations of this instant application may use different configurations of the Syn-Gas input grid as long as the function of directing the catalyst to the maintenance port is accomplished.

1150 illustrates the flow of Syn-Gas as being upward. In this illustration of this implementation of this instant application the orientation of the FT reactor is vertical with the gaseous flow from the lower section of the reactor to the upper section. Other implementations of this instant application may have the orientation vertical with the gaseous flow downward from the upper to lower sections of the reactor. The orientation of the reactor may be non-vertical with other gaseous flow accordingly. 1160 is a gaseous reaction of products which exit the reactor. In this implementation, the orientation of the reactor is vertical with the gaseous flow upward through the reactor. As the Syn-Gas contacts the catalyst it is converted to hydrocarbons per the Fischer-Tropsch reaction process. Because of the temperature within the reactor, these hydrocarbon products are maintained in a gaseous state and exit the reactor in a gaseous state.

1170 is a gas screen or grid at top of reactor. In this implementation, with gaseous flow upward, the gaseous hydrocarbon reaction products exit the section containing the catalyst through a gas screen or grid at the top of the reactor. This grid only acts to keep the catalyst in place, preventing it from entering the flow of gaseous reaction products exiting the reactor. 11200 is a lower maintenance port. In this implementation, a maintenance port is located at the lowest section of the reactor containing catalyst. The maintenance port is simply an opening in the section of the reactor containing the catalyst. The maintenance port opening is large enough to allow catalyst to move or flow freely out of the lower portion of the section containing the catalyst. With a vertical orientation of reactor, this lower maintenance port is nominally used to remove the catalyst from the reactor. As seen in this illustration of this implementation of this instant application the maintenance port has a pipe or tube that transits the cooling jacket of the reactor. This is to give access to the maintenance port from outside of the reactor. Other reactor orientations will have the maintenance port used to remove the catalyst in different orientations.

11210 is a lower maintenance port plug. In this illustration of this implementation of this instant application the lower maintenance port is closed during normal operations using a plug. The maintenance port plug acts to close-off the maintenance port and provide a somewhat smooth transition to the wall of the reactor section containing the catalyst. By closing off the maintenance port at wall of the reactor, catalyst will not tend to collect in the maintenance port and thus not be functional in the FT reaction process. The maintenance port plug is the full length of the maintenance port access tube through the coolant jacket. In this illustration of this implementation of this instant application, although not specifically shown, pressure flanges and seals are at the junction of the outside section maintenance port access tube and outer section of the maintenance port plug.

11220 is an upper maintenance port, in this implementation a maintenance port is located at the highest section of the reactor containing the catalyst. The maintenance port is simply an opening in the section of the reactor containing the catalyst. The maintenance port opening is large enough to allow catalyst to move or flow freely into the upper portion of the section containing the catalyst. With a vertical orientation of reactor, this upper maintenance port is nominally used to install the catalyst in the reactor. As seen in this illustration of this implementation of the instant application the maintenance port has a pipe or tube that transits the cooling jacket of the reactor. This is to give access to the maintenance port from outside of the reactor. Other reactor orientations will have the maintenance port used to install the catalyst in different orientations.

11230 is an upper maintenance port plug. In this illustration of this implementation of this instant application the upper maintenance port is closed during normal operations using a plug. The maintenance port plug acts to close-off the maintenance port and provide a somewhat smooth transition to the wall of the reactor section containing the catalyst. By closing off the maintenance port at wall of the reactor, catalyst will not tend to collect in the maintenance port and thus not be functional in the FT reaction process. The maintenance port plug is the full length of the maintenance port access tube through the coolant jacket. In this implementation, although not specifically shown, pressure flanges and seals are at the junction of the outside section maintenance port access tube and outer section of the maintenance port plug.

Example embodiments may include a Fischer-Tropsch reactor, where the catalyst loosely fills the reactor, where the reactor has a maintenance port at the base catalyst filled section of the reactor, where the maintenance port at the base of the catalyst filled section is filled with a maintenance port plug during operation of the reactor, where there is a maintenance port at the top of the catalyst filled section of the reactor, where the maintenance port at the top of the catalyst filled section of the reactor is plugged with a maintenance port plug during operation of the reactor, where the base of the reactor has a Syn-Gas input grate which holds the loosely filled catalyst at the base of the catalyst filled section of the reactor, where the input grate is angled such that the loosely filled catalyst will exit maintenance port at the base of the catalyst filled section of the reactor when the maintenance port plug is removed and the maintenance port is opened when the reactor is not in operation, where when the maintenance port plug at the top of the catalyst filled section of reactor is removed and the maintenance port at the top of the catalyst filled section of the reactor is opened catalyst is allowed to be inserted into the reactor, where the reactor is in a vertical orientation.

Another example embodiment provides a Fischer-Tropsch reactor, where the catalyst loosely fills the reactor, where the reactor has a maintenance port at the base catalyst filled section of the reactor, where the maintenance port at the base of the catalyst filled section is filled with a maintenance port plug during operation of the reactor, where there is a maintenance port at the top of the catalyst filled section of the reactor, where the maintenance port at the top of the catalyst filled section of the reactor is plugged with a maintenance port plug during operation of the reactor, where the base of the reactor has a Syn-Gas input grate which holds the loosely filled catalyst at the base of the catalyst filled section of the reactor, where the input grate is angled such that the loosely filled catalyst will exit maintenance port at the base of the catalyst filled section of the reactor when the maintenance port plug is removed and the maintenance port is opened when the reactor is not in operation, where when the maintenance port plug at the top of the catalyst filled section of reactor is removed and the maintenance port at the top of the catalyst filled section of the reactor is opened catalyst is allowed to be inserted into the reactor, where the reactor is not in a vertical orientation.

Example embodiments provide a unit system where the component assemblies are adjusted and scaled down to dimensions fitting within a single unit system that will fit within an intermodal transport container or other standard transport container. The pressures, temperatures and flow time within each of the component assemblies will be adjusted to compensate for the novel dimensions of this instant patent.

In addition to the scaled down dimensions of the component assemblies, the unit system of this instant patent will make use of the SCADA instrumentation and control systems in a novel way. Much of the same functional sensors, temperature, pressure, and flow rate, and the functional valve and other controls that would be found in a large facility are part of the unit system, but the level of automation of the controls is much greater. The implementation of the SCADA instrumentation and control systems are specific to allowing the unit system of this instant patent to be located at a "dark site", as site where there are no personnel on site for long periods of time, except for scheduled maintenance and inspection.

In addition to the higher level of automation, the unit system of this instant patent also contains Remote Monitoring and Management (RMM) functions that operate through a reliable communications link to a Remote Operations Management Facility (ROMF). The RMM functionality of the unit system of this application allows the ROMF to manage multiple deployed unit systems at widely dispersed sites. Unlike large facilities that have many personnel constantly working at each of the large facilities, the personnel supporting these unit systems can be shared across many system units, reducing one of the highest operational costs of synthetic hydrocarbon production facilities.

Also in situations where there is a natural disaster or other situation, there will not normally be any personnel at risk at the unmanned sites where the unit systems of this instant patent are located. When regular maintenance is scheduled for a specific unit system, the unit system can be shut down remotely, so that the maintenance personnel are not put at the risk of having to manually shut down a unit system, or do maintenance on a unit system that is actively operating, with volatile processes producing volatile liquid hydrocarbons.

Specific to the technologies integrated within the unit system is the Fischer-Tropsch (FT) reactor. This application includes a design of a FT reactor that incorporates many of the features of existing designs but in a way that greatly reduces the vertical height of those designs. The reduction of vertical height will allow the FT reactor of this instant patent design to fit within the physical height restrictions of a single unit portable gas to liquid designed to fit within an intermodal transport container or other standard transport container.

The instant application describes a Fischer-Tropsch reactor that is vertically compact and can be mass produced from standard parts and modular assemblies to fit along with all the other components of a gas to liquid production system with a single transportable container. The specific Fischer-Tropsch reactor of the present embodiments is designed to be vertically compact yet have all the processing functionality of larger reactors. There are several patents for devices that make some part of the gas to liquids process portable but they still require significant onsite support, in terms of power, water, control and maintenance. This reactor is also designed to allow catalyst removal, inspection, replacement regeneration, or re-activation without reactor shutdown.

Figure 7:
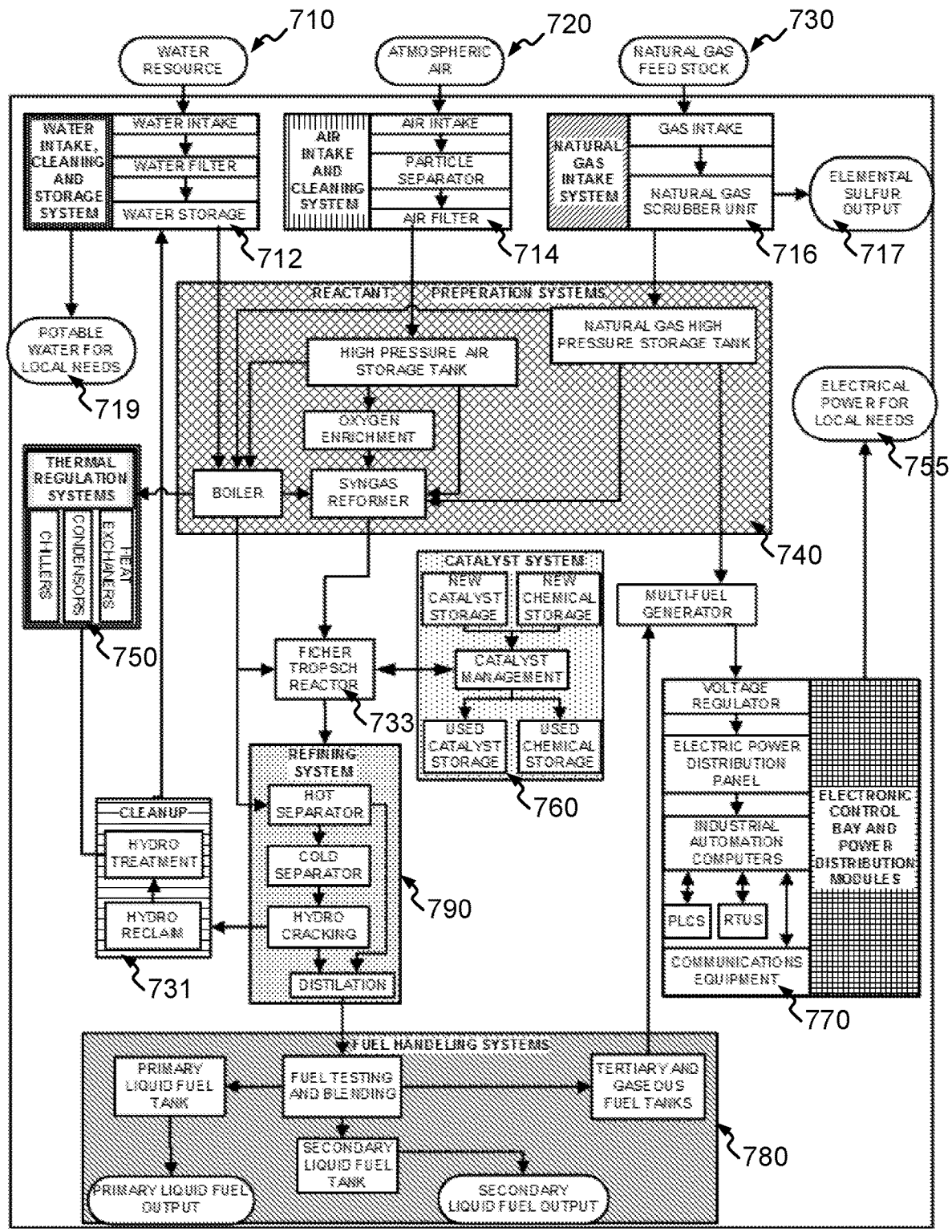
FIG. 7 illustrates another system configuration of the reactor support system according to example embodiments.

FIG. 7 depicts the overall configuration and relationships of the processes specific to components contained within one embodiment of the instant unit system using current conventional technology in each of the components and component assemblies, but configured in a novel manner for the production of a standard blend of synthetic liquid hydrocarbons to be used as a "diesel" type fuel. Different embodiments of the instant unit system can have different technologies used any or each of the component assemblies which will change the component assemblies and the interconnectivity of the component assemblies. Different embodiments of the instant unit system can be for the purpose of producing different types and blends of liquid long chain hydrocarbons which will change the components and component assemblies and the interconnectivity of the component assemblies.

The raw inputs of natural gas, water and air are all initially drawn from outside of the unit, and conditioned. Air is filtered to ensure that abrasive particles are not ingested into the generator or boiler modules. Similarly, water is filtered to remove contaminants and thus prevent scale and maintenance issues in the boiler. Lastly, on the input side, the natural gas goes through a scrubber to remove sulfur and other pollutants. Regardless of which of the components and component assemblies that are implemented or the technology that is used for any or all of the components and component assemblies or the interconnectivity of the components and component assemblies, of any embodiment of the instant unit system, the inclusion of the components, component assemblies and their functions within a single mobile unit system is novel.

This schematic also depicts the catalyst management system, the storage for replacement catalyst, and chemicals as well and storage for used chemicals and catalyst that cannot be reactivated in the field and must be reprocessed else ware. Much of the piping is omitted for clarity, the arrows indicate the general process flow.

In FIG. 7, the water resource 710, the atmospheric air 720 and the natural gas feed stock 730 are shown as part of corresponding intake systems 712, 714 and 716. The output of sulfur 717 is a byproduct of the gas intake system. The reactant system 740 processes the input via various tanks and procedures. The reactor 733 is part of the overall system, as is the catalyst system 760, the thermal regulation 750, the electrical system 770, the refining system 790, the cleanup system 731 and the fuel handling system 780.

Figure 8:
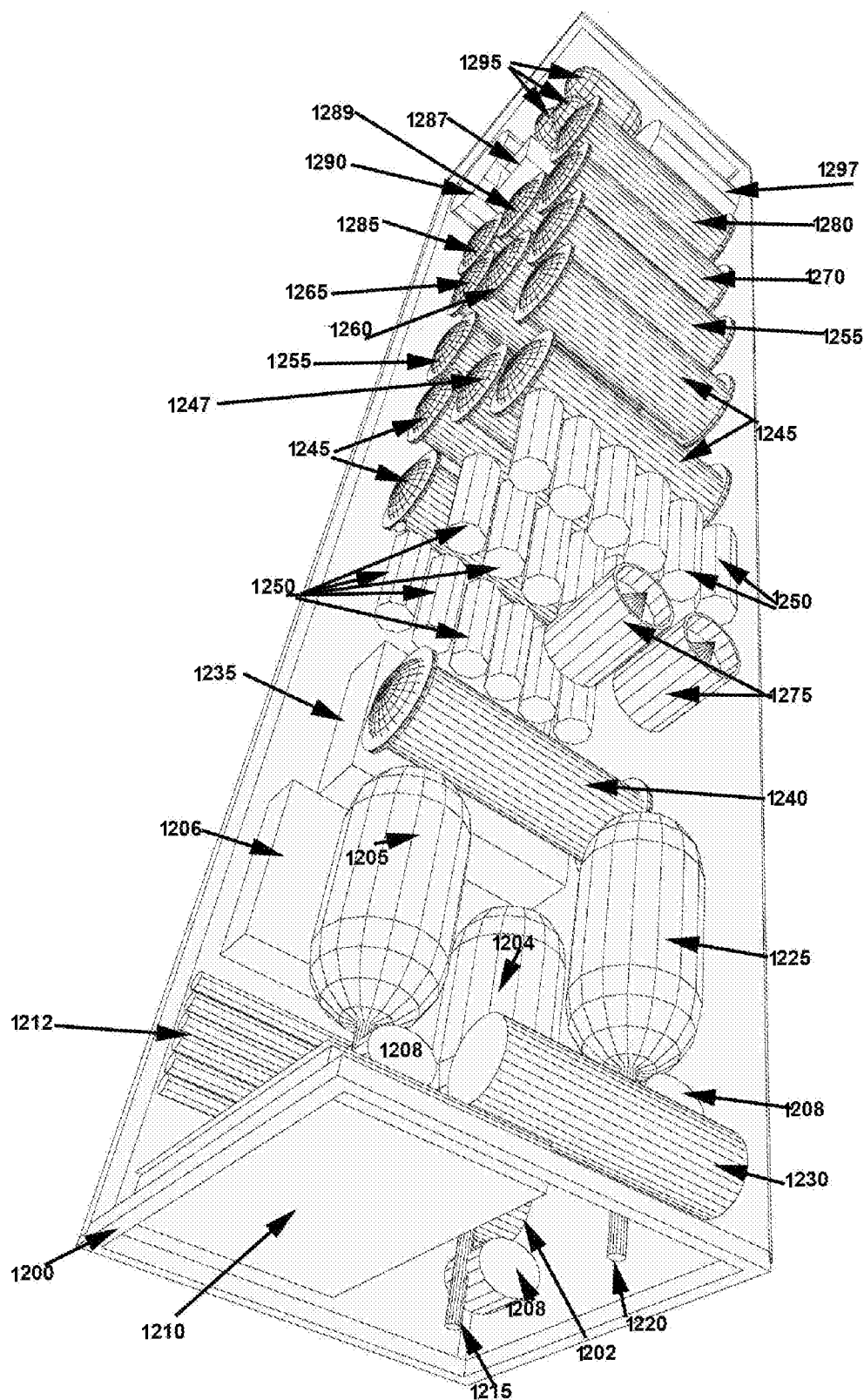
FIG. 8 illustrates a hardware configuration of the reactor system in a mobile vehicle cargo setup according to example embodiments.

FIG. 8 is an internal layout of the overall system according to one embodiment of the instant application. Other embodiments of this instant application can have any or all of the various assemblies located differently within the mobile unit. Some components or assemblies may be replaced with new technology which changes the location and the interconnection of those components and assemblies. One or more components or assemblies may be removed because the type and grade of liquid hydrocarbons is different for one embodiment from one or more other embodiments.

Only the functions of each of the various components and assemblies is described for this embodiment. Specific embodiments of each of the various components and assemblies is not described because each of the various assemblies may be replaced within production or in the field as new technologies and assembly designs are available from vendors or through a related design team. The general location and interconnectivity of the various components and assemblies may not change when old components and assemblies are replaced with new ones or with new technologies of those components and assemblies.

The entire unit frame 1200 is designed to be moved by standard forms of transport, the support frame provides the essential support and protection for system components and assemblies. The support frame may be configured in the dimensions and structure of an intermodal container to facilitate transport by semi-tractor, rail, or container ship. The support frame may be configured in the dimension and structure of an open frame, or it may be configured in the dimensions and structure of a standard semi-tractor trailer.

The water cleaning system 1202 remove particles and contaminates by means of centrifugal particle separators and traditional filter technology. The water cleaning system receives water from the water intake (1215) and the hydro reclaim (1280) system. Once the unit is running, the process produces an excess of water that may be reclaimed and purified for other uses. The water storage tank 1204 provides internal storage of the supply of water from the water cleaning system or purified water from the water purification system. The water in the water storage tank can be used for the various processes specific to the SynGas conversion process such as the SynGas Reformer (1250) and the Fischer-Tropsch reactor (1245). Water in the water storage tank can also be made available for local needs.

The air tank 1205 provides a standard pressure vessel for holding air with the contaminants removed and feed it into the various components at controlled rates. The air tank receives non-contaminated air from the air intake and cleaning system (1210) and outputs the pressurized non-contaminated air primarily to the boiler (1240) and the multi-fuel generator (1275).

1206 is the local display and control panel which is used to display the functional conditions of the various components and processes in the system unit, and to provide a local method to manage the system unit, to start up or shut down the unit system if needed. The local display and control panel connects to the automation computers in the electronic control bay (1235). The input compressors 1208 are used to provide pressurization to the input air and to the natural gas feed stock when and where necessary for the optimum operation of the system unit. The input compressors receive input air from the air intake and cleaning system (1210) and the natural gas scrubbing unit (1230) and output to the air tank (1205) and the natural gas high pressure storage tank (1225) respectfully.

The air intake and cleaning systems 1210 draws in ambient air and removes particles and contaminates by means of centrifugal particle separators and traditional filter technology. The cleaned air is input to one of the input compressors (1208) where it is pressurized and sent to the air tank (1205). The thermal system 1212 is a system of heat exchanges, condensers and chillers regulates the flow of thermal energy around the system. Waste heat from some processes is used to preheat reactants for others.

The water intake 1215 receives water from local sources when there is not enough water in the water storage tank for proper function of the system unit. The water intake goes into the water cleaning system (1202). The natural gas input 1220 is a considerable portion of the domestically produced natural gas is so called "sour gas". It contains impurities like hydrogen sulfide, hydrogen cyanide and other dangerous or noxious chemicals. The technology to remove and safely sequester these compounds is common within the natural gas pipeline industry. A commercially available "scrubber" will be used to remove these impurities. The "scrubbed" natural gas is sent to one of the input compressors (1208) where it is pressurized and then sent to the natural gas high pressure storage tank (1255).

The natural gas tank 1225 provides a standard pressure vessel for holding natural gas that has had contaminants removed and feed it into the various components and controlled rates. The natural gas high pressure storage tank receives pressurized natural gas from an input compressor (1208) and sends the pressurized natural gas to the SynGas reformer (1250), the multi-fuel generator (1275) and the boiler (1240). The natural gas scrubbing unit 1230 is modular in nature and can have any internal arrangement suitable to for removing sulfurous compounds and other pollutants from the feed stock before synthesis. The natural gas scrubbing unit receives natural gas feed stock from the natural gas intake (1220) and sends the "scrubbed" natural gas to one of the input compressors (1208) where it is pressurized for storage in the natural gas high pressure storage tank (1225). Pollutants of particular interest include but are not limited to hydrogen sulfide and hydrogen cyanide. The electronic control bay 1235 houses the necessary programmable logic controllers (PLCs), remote terminal units (RTUs), industrial automation computers, communications equipment, to support process automation and either remote or onsite process control and management. Broadly this is called the Supervisory Control and Data Acquisition system (SCADA) for this device. The SCADA system is used to connect the PLCs and RTUs to the various sensors and controller devices connected to the various components within the system unit. This bay also contains equipment to regulate voltage and provide power distribution to equipment with in the bay and other devices and components within the system unit that may have requirement, such as the input compressors (1208). To facilitate this, it is anticipated that 110 and 220 VAC, 60 Hz power will be provided as well as 12 and 24 V DC. The power connections will be of standard types to facilitate compatibility with existing equipment. The VAC wiring will be contained and routed through rated explosion proof cabling and conduits.

The boiler 1240 produces high temperature, high pressure steam for various stages in the synthesis process. The boiler receives water from the water storage tank (1204) and outputs steam to the SynGas reformer (1250) and possibly other functional units within the system unit. The heat energy is produced by burning natural gas received from the natural gas high pressure storage tank (1225). Waste heat from the multi-fuel generator (1275) may also be used as a heat energy source for the boiler.

The Fischer-Tropsch reactor 1245 is a device well known in the synthetic hydrocarbon industry. A Fischer-Tropsch reactor can have any of many configurations suitable for the Fischer-Tropsch process of converting "SynGas" (CO+H2) into long chain hydrocarbons. The Fischer-Tropsch process is well documented in many books and papers in organic chemistry and synthetic hydrocarbon industries. The reactor in this system unit is modular in nature and can have any internal arrangement suitable for the Fischer-Tropsch process. It may also include a system to remove, inspect and reprocess the catalyst onsite. The Fischer-Tropsch reactor receives SynGas from the SynGas reformer (1250) and outputs long chain hydrocarbons to the hot separator (1255). An integral cooling jacket and radiators may be added to aid thermal management depending on climate. Thermal energy removed from on stage of this process is used to facilitate others by heat exchangers.

The catalyst management system 1247 receives the catalyst form the FT reactor (1245) while it is still in operation. It measures the degree of contamination and uses suitable chemical and mechanical means to renew the surface of the catalyst, re inspects it and re inserts it into the reactor without costly down time. Catalyst to work to be regenerated is automatically replaced with fresh catalyst form an onboard supply and the worn catalyst and used chemicals are retained for latter reprocessing or disposal. The SynGas reformer 250 is modular in nature and can have any internal arrangement (i.e. steam methane, plasma, or arc discharge) suitable for converting gaseous hydrocarbons (methane, ethane, propane, butane mixtures) into "syn-gas" (CO+H2). The SynGas reformer receives natural gas from the natural gas high pressure storage tank (1225) and outputs the SynGas to the Fischer-Tropsch reactor (1245). Depending on the technology used within the SynGas reformer, it may also receive high-pressure steam from the boiler (1240). Additionally, the syngas reactor or FT reactor may be unitary or many segmented to accommodate the necessary flow rate and volume.

The hot separator 1255 is modular in nature and can have any internal arrangement suitable for separating liquid and gaseous down-stream hydrocarbon products at high temperatures and pressures. The hot separator receives liquid and gaseous hydrocarbon products from the Fischer-Tropsch reactor (1245), outputs liquid hydrocarbons to the distillation unit (1285) and gaseous hydrocarbons to the cold separator (1260).

The cold separator 1260 is modular in nature and can have any internal arrangement suitable for separating liquid and gaseous down-stream hydrocarbon products at low temperatures and high pressures. The cold separator receives gaseous hydrocarbons from the hot separator (1255), outputs liquid hydrocarbons to the distillation unit (1285) and gaseous hydrocarbons to the hydro cracker (1265).

The hydro cracker 1265 is modular in nature and can have any internal arrangement suitable for breaking down and separating any hydrocarbon chains that are too long or "waxy" for inclusion in the final product. The hydro cracker receives gaseous hydrocarbons from the distillation unit (1285), sends liquid hydrocarbons to the distillation unit (1285) and the waste water, naphtha and gas-oil hydrocarbon slurry to the hydro treatment unit (1270). The hydro treatment 1270 is modular in nature and can have any internal arrangement suitable for removing nitrogen, oxygen and other impurities from the naphtha and gas-oil hydrocarbon slurry. The hydro treatment unit receives non-potable water from the hydro reclaim unit (1280) and sends potable water to the water storage tank (1204).

The multi-fuel generator 275 is modular in nature and can have any internal arrangement suitable to for converting gaseous hydrocarbons into mechanical and electrical energy via internal combustion. The arrangement of an aero-derived multi-fuel gas turbine attached to an alternator through a gear-train should produce acceptable results. The waste thermal energy from the exhaust may be captured to preheat water supplied to the boiler. The hydro reclaim unit 280 is modular in nature and can have any internal arrangement suitable to for removing water from the product mixture so it can be reused, and the final fuel product will be contamination free. The hydro reclaim receives a water and liquid hydro carbon slurry from the hydro cracker (1265) and outputs waste product non-potable water to the hydro treatment unit (1270).

The distillation unit 280 is modular in nature and can have any internal arrangement suitable to for performing fractional distillation and separation of hydrocarbon products for final blending and output. The distillation unit receives liquid hydrocarbons from the hot separator (1255), the cold separator (1260) and the hydro cracker (1265) and sends the separated liquid hydrocarbon products to the fuel testing and blending unit (1287).

The fuel testing and blending unit 1287 and 1289 test the length of the hydrocarbon chains produced by the Fischer-Tropsch reactor (1245) to verify that they are correct for the desired fuel blend to be produced by the system unit, and then blend those desired length hydrocarbons to the correct ration for the desired fuel blend. The fuel testing and blending unit receives the separated hydrocarbons from the distillation unit (1285) and outputs the desired blended liquid fuel to the main fuel tank (1290). Hydrocarbons that do not meet the requirements of the desired liquid fuel are sent to the tertiary and gaseous fuel tanks (1295), and to the secondary fuel tank (1297) for any hydrocarbons that may also be of interest as a liquid fuel, but not the desired liquid fuel. Testing can use any means for hydrocarbon measurer including but not limited to gas chromatograph, light spectrogram and or mass spectrometer etc.

The main fuel tank 1290 is modular in nature and can have any internal arrangement suitable to for containing the primary hydrocarbon product. The desired liquid fuel, primary hydrocarbon product, is stored here temporarily until pumped away for use. The main fuel tank receives the primary hydrocarbon product from the fuel testing and blending unit (1287) and outputs through a fuel product output valve (Not shown). The tertiary tank array 1295 is modular in nature and can have any internal arrangement suitable to for containing the gaseous/liquid mixed hydrocarbon products that are of less interest. These may be taped for external usage or cycled back into the system for internal energy production. The tertiary and gaseous fuel tanks receive the liquid and gaseous hydrocarbons that do not meet the requirements of the desired fuel from the fuel testing and blending unit (1287) and outputs them to the multi-fuel generator (1275) or through output service valves (Not shown).

The secondary fuel tank 1297 is modular in nature and can have any internal arrangement suitable to for containing the secondary hydrocarbon products of interest. The secondary fuel tank receives the secondary hydrocarbon products from the fuel testing and blending unit (1287) and outputs through a secondary fuel output valve (Not shown).

Figure 9A:
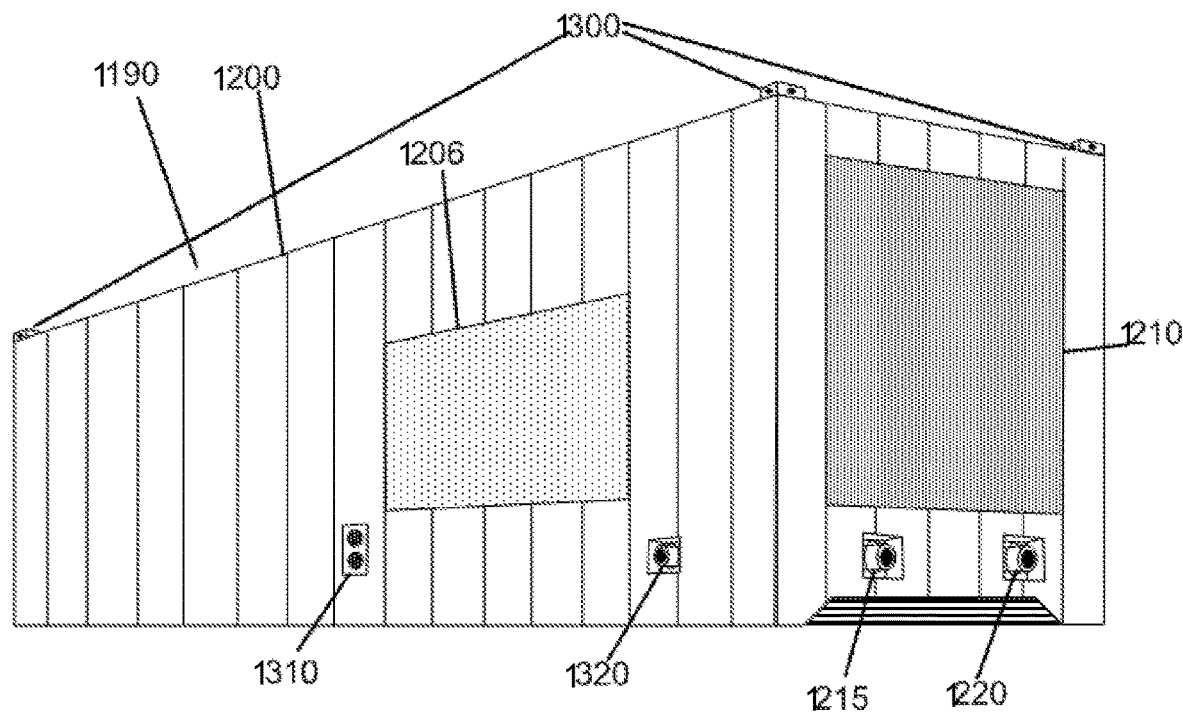
FIGS. 9A and 9B illustrate a housing of the reactor support system according to example embodiments.
Figure 9B:
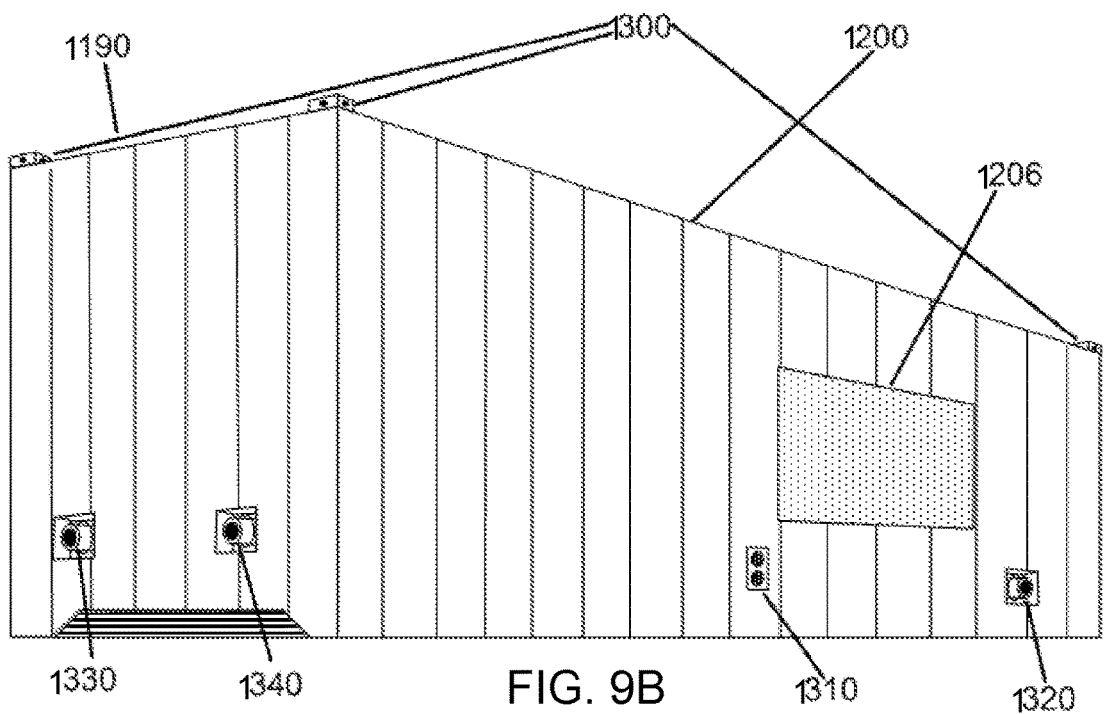

FIGS. 9A and 9B illustrate the mobile unit system 1190 from one external view. This view shows the support frame 1200 configured as an Intermodal Container. The mobile unit system 1190 is viewed from the end of the unit with the air intake 1210 as shown in FIG. 8. The entire unit 1200 is designed to be moved by standard forms of transport. In this embodiment, the support frame is configured in the dimensions and structure of an intermodal container to facilitate transport by semi-tractor, rail, or container ship. The support frame may be configured in the dimension and structure of an open frame, or it may be configured in the dimensions and structure of a standard semi-tractor trailer.

Part of the standard structure of an intermodal container 1300 are lift points to facilitate the lifting and movement of the container to and from different transport systems such as rail cars, semi-tractor trailer chassis, or container ships. The local display and control panel 1206 is used to display the functional conditions of the various components and processes in the system unit, and to provide a local method to manage the system unit, to start up or shut down the unit system if needed. A large capacity air intake 1210 is provide so atmospheric oxygen may be harvested for the FT process.

The water intake 1215 receives water from local sources when there is not enough water in the water storage tank for proper function of the system unit. Natural gas feed stock 1220 that is to be converted to synthetic liquid hydrocarbons is feed into the mobile unit system through this natural gas intake. Electrical power connection 1310 provides excess generated power is available for local needs. Alternatively, locally available power may be used for to power the unit in-case of onboard power failure, or for cold startups. Outlet for the waste water 1320 that has been conditioned to provide potable water for local needs.

Figure 10A:
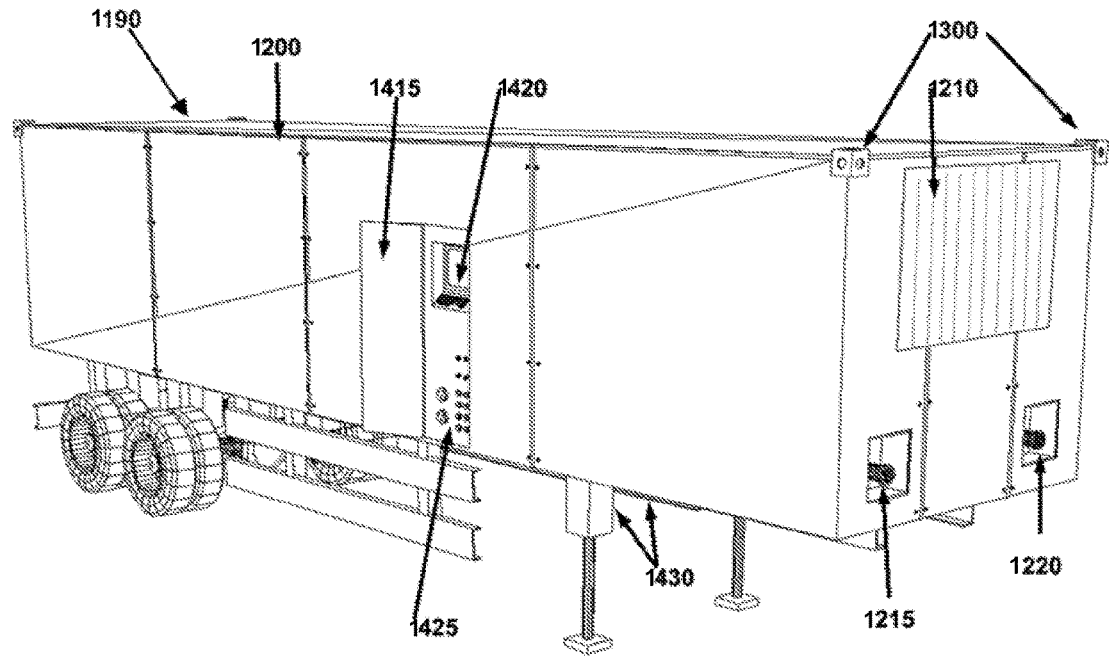
FIGS. 10A and 10B illustrate another housing of the reactor support system according to example embodiments.
Figure 10B:
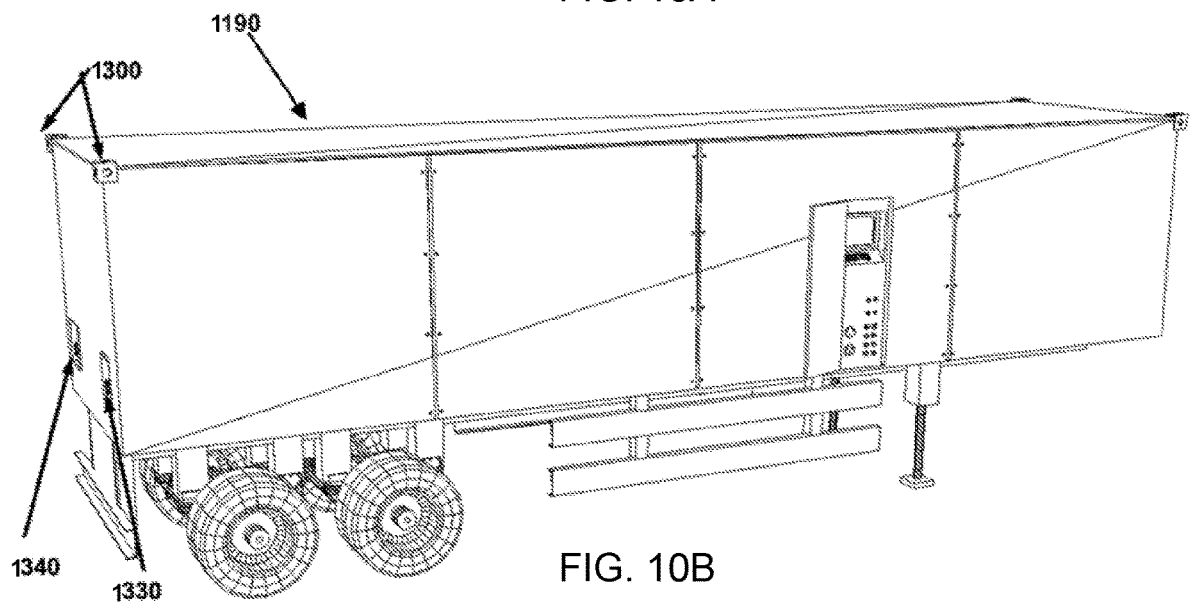

FIGS. 10A and 10B depicts the mobile unit system 1190 from another external view. This view shows the support frame 1200 built as an intermodal container. The mobile unit system 1190 is viewed as the same intermodal container as FIGS., but from the end of the unit with liquid hydrocarbon product outputs. The entire unit 1200 is designed to be moved by standard forms of transport. In this embodiment, the support frame is configured in the dimensions and structure of an intermodal container to facilitate transport by semi-tractor, rail, or container ship. The support frame may be configured in the dimension and structure of an open frame, or it may be configured in the dimensions and structure of a standard semi-tractor trailer container. Part of the standard structure of an intermodal container are lift points 1300 to facilitate the lifting and movement of the container to and from different transport systems such as rail cars, semi-tractor trailer chassis, or container ships.

The local display and control panel 1420 is used to display the functional conditions of the various components and processes in the system unit, and to provide a local method to manage the system unit, to start up or shut down the unit system if needed. A door 1415 provides safety to the control panel. The electrical power connection 1425 for the electrical power that is provided for local needs. Outlet 1215 and 1220 for the waste water that has been conditioned to provide potable water for local needs. The desired primary liquid hydrocarbon product fuel 1330 containing the desired long chain hydrocarbon blend is output through this to external storage or liquid transport units or facilities. Liquid hydrocarbons that do not meet the desired long chain hydrocarbon blend requirements, but still considered worth while are output through this 1340 to external storage or liquid transport units or facilities. By conforming to the external standards for an ISO semi-tractor trailer containers and international intermodal shipping containers, the unit may be transported by road, rail, sea or air using standard transportation practices and equipment. An external access panel (1415) is depicted as being open in this figure to reveal the SCADA and management interface console (1420) and power output plugs (1425). Normally this would be closed for shipping. The power plugs (1425) will provide power to external devices using common power standards and electrical receptacles.

These could include but are not limited to 110 V and 220 V AC 60 Htz, and 12/24 V DC. The GTL unit (1190) is self-contained and may be removed from the transport chassis (1430). Standard lift points (1300) are provided to facilitate transportation. The Air Intake (1210) is prominently visible at the end of the device as are the water and natural gas input connections (1215) (1220). The primary and secondary produce output ports are shown at the opposite end (1330)-(1340). A large capacity air intake 1210 is provided so atmospheric oxygen may be harvested for the FT process. The external electronics bay door 1415, provides access to a variety of electronic systems, controls and electrical power hookups. The management console 1420 gives onsite personnel access to the controls systems necessary to start, stop and maintains the unit. I also provides access to the diagnostic systems, and SCADA systems. This takes the form of an output screen capable of displaying a graphic user interfaces, ruggedized, input keyboard, computer pointing device (mouse, trackball, glide point, touch screed etc). Security function are in place to prevent unauthorized changes to systems settings. This console also incorporates interface ports to service the computer systems and sufficient internal and external communication facilities to remotely manage this unit.

External power connection panel 1425. This panel allows external devices to be powered form the internal power network of the unit. Standard plugs are provided for both alternating and direct current power of various standards. This panel also for access to the circuit breakers and other safety systems associated with power connections.

Standard highway trailer chassis 1430 facilitates road transportation. Water connection 1215 this quick connect pipe provides for filling or draining the onboard water supply and purification system. The natural gas intake port

1220, is a quick connect high pressure fitting to connect the system to its feed stock. The primary product output connection 1330 allows for the transfer of liquid petroleum products to external holding facilities in accordance with standard petrochemical handling procedures. Secondary product output 1340 connection allows for the transfer of different liquid petroleum products to external holding facilities in accordance with standard petrochemical handling procedures.

Example embodiments provide a portable system for converting short chained gaseous hydrocarbons into long chained liquid hydrocarbons, the system consisting of at least one of: one or more housing(s) or container(s), an integrated power source(s), an electronic control bay, automated measurement and control equipment, filter and processing equipment to extract impurities form the air, water and hydrocarbon feed stocks, a boiler to produce high pressure steam, a thermal reformer, a Fischer-Tropsch reactor, hot and cold separators, hydro cracking, waste water treatment, and final product blending, the system also contains communications equipment for remote operation management and reporting. All of the major components may be moved intact in standard international shipping containers.

The system may be powered by either the feed stock hydrocarbons or hydrocarbons left over from the process that do not meet final product specifications. The process is automatically regulated by a computer control system to ensure the correct product production. The computer control system is located in the electronic control bay. The major assemblies for at least one of: the boiler, steam vessel, thermal reformer, Fischer Tropsch reactor, separators and water treatment are fully modular and field replaceable. The enclosure for at least one of each major assembly is standardized and interchangeable, with piping pass-throughs running through the end caps of the cylinders.

Sensors and automation control devices are used to continually adjust the process. The sensors and automated control devices are located though out the unit system on the various components in the unit system. The sensors provide information about the processes within the various components to the computer control system which then makes adjustments to the processes using the automation control devices.

An excess of electrical power is produced by the integrated power source an provided for on sight needs. An excess of potable water is produced by the Fischer-Tropsch process in the Fischer-Tropsch reactor, and conditioned by the waste water treatment for on sight needs.

In certain embodiments, a system comprises a number of elements including: a Fischer-Tropsch reactor, an integrated power source, filter and processing equipment to extract impurities form air, water and short chain gaseous hydrocarbon feed stock, a boiler to produce high pressure steam, a methane to synthesis gas (syn-gas) reformer, a waste water purification system, and a catalyst management system, wherein the system is portable, wherein the elements are communicably coupled and are contained in a single housing of dimensions meeting intermodal shipping container requirements.

The reactor allows at least one of catalyst removal, inspection, replacement regeneration, or re-activation without reactor shutdown and the catalyst management system removes catalysts from the Fischer-Tropsch reactor while it is in operation, and inspects the catalyst for degradation, utilizes chemical and mechanical techniques to reactivate the catalyst and either reinsert it in the Fischer-Tropsch reactor or replace it from a ready supply and retains any replaced catalyst or chemicals for future use or disposal.

Waste product water is purified via the filter and processing equipment and reused as water feed stock and the system is powered by the short chain gaseous hydrocarbon feed stock and/or by long chain liquid hydrocarbons.

The system elements further include automated sensors and measurement and control equipment which are used to adjust processes within the portable system, wherein the processes are regulated by an automated control computer utilizing the automated sensors and the measurement and control equipment.

An excess of electrical power is produced, by the integrated power source, and conditioned for on-sight needs and waste product water produced by the Fischer-Tropsch reactor is purified and conditioned for on-site needs.

In an embodiment a system comprises a Fischer-Tropsch reactor including one or more spiral paths that facilitate a reaction of synthesis gas (syn-gas) feed stock with at least one catalyst, wherein the reaction synthesizes multiple longer chains of hydrocarbons, wherein the reactor manages an inflow of the syn-gas feed stock and an outflow of hydrocarbon products, wherein the catalyst is a solid catalyst of a geometry and size conducive to fluid like movement through the reactor and through a regenerative catalyst management system.

The geometry of the catalyst increases a contact time between the syn-gas and the catalyst, wherein the catalyst is autonomously inspected for degradation and restored to a more efficient function via the catalyst management system, wherein the catalyst management system utilizes chemical and mechanical techniques to remove contaminants from the catalyst, wherein the catalyst management system autonomously evaluates an effectiveness of the contaminant removal, wherein the catalyst management system substitutes a new catalyst for the catalyst if the contaminant removal is not effective, wherein the new catalyst is located on-board the system, and wherein the contaminated catalyst is retained for future use or disposal.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the application as discussed above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent, while remaining within the spirit and scope of the application. In order to determine the metes and bounds of the application, therefore, reference should be made to the appended claims.

While preferred embodiments of the present application have been described, it is to be understood that the embodiments described are illustrative only and the scope of the application is to be defined solely by the appended claims when considered with a full range of equivalents and modifications thereto.

What is claimed is:

1. A portable system for converting short chain gaseous hydrocarbons to long chain hydrocarbons, comprising:

a housing having dimensions that meet intermodal shipping container requirements;

a water purification system placed in the housing and configured to provide filtered water within the housing;

an air purification system placed in the housing and configured to provide filtered air within the housing;

a natural gas intake system configured to provide short chain gaseous hydrocarbon feed stock within the housing;

a boiler placed in the housing and configured to produce high pressure steam from the filtered water;

a synthesis gas (syn-gas) reformer placed in the housing and configured to receive the high pressure steam from the boiler, receive the short chain gaseous hydrocarbon feed stock from the natural gas intake system, and to produce syn-gas; and Fischer-Tropsch reactor placed in the housing, the Fischer-Tropsch reactor comprising i) a cylindrical shell, ii) a central cylinder placed within the cylindrical shell and configured to form a coolant flow path for coolant inside the central cylinder in a direction along a longitudinal axis of the cylindrical shell, iii) a helix placed inside the cylindrical shell and configured to wrap around the central cylinder so as to create a spiral flow path between the cylindrical shell and the central cylinder, iv) a first grate placed over a first end of the cylindrical shell, and v) a second grate placed over a second end of the cylindrical shell, wherein the Fischer-Tropsch reactor is configured to convert the syn-gas to long chain gaseous hydrocarbons in the presence of a catalyst, wherein the catalyst is fixed in the spiral flow path by the first grate, the second grate, and the cylindrical shell.

2. The system of claim 1, wherein the Fischer-Tropsch reactor further comprises:

a maintenance port coupled to the cylindrical shell; and a plug placed in the maintenance port, wherein the plug is configured to be removed when the Fischer-Tropsch reactor is not in operation to allow at least one of catalyst removal, inspection, replacement, regeneration, or re-activation when the Fischer-Tropsch reactor is not in operation.

3. The system of claim 1, further comprising:

a refining system placed within the housing and coupled to an outlet of the Fischer-Tropsch reactor and configured to convert the long chain gaseous hydrocarbons received from the Fischer-Tropsch reactor to fuel;

a fuel handling system placed within the housing and coupled to the refining system and configured to provide a primary liquid fuel and a secondary liquid fuel;

a generator placed in the housing and configured to convert the short chain gaseous hydrocarbon feed stock and/or the fuel into electrical power and to provide the electrical power to an electrical system within the housing.

4. The system of claim 3, wherein the primary liquid fuel and the secondary liquid fuel each comprise long chain liquid hydrocarbons.

5. The system of claim 3, wherein the fuel comprises long chain liquid hydrocarbons.

6. The system of claim 1, further comprising automated sensors and measurement and control equipment placed in the housing and coupled with one or more of the water purification system, the air purification system, the natural gas intake system, the boiler, the synthesis gas (syn-gas) reformer, and the Fischer-Tropsch reactor.

7. The system of claim 6, further comprising an automated control computer placed in the housing, coupled to the automated sensors and the measurement and control equipment, and configured to control one or more of the water purification system, the air purification system, the natural gas intake system, the boiler, the synthesis gas (syn-gas) reformer, and the Fischer-Tropsch reactor.

8. The system of claim 1, wherein the catalyst comprises solid spheres.

9. A Fischer-Tropsch reactor comprising:

a cylindrical shell having a first end and a second end;

a central cylinder placed within the cylindrical shell and configured to form a coolant flow path for coolant inside the central cylinder in a direction along a longitudinal axis of the cylindrical shell;

a helix placed inside the cylindrical shell and configured to wrap around the central cylinder so as to create a spiral flow path between the cylindrical shell and the central cylinder, wherein one end of the spiral flow path opens to the first end of the cylindrical shell and another end of the spiral flow path opens to the second end of the cylindrical shell;

a catalyst contained in the spiral flow path;

a first grate placed over the first end of the cylindrical shell; and a second grate placed over the second end of the cylindrical shell wherein the catalyst is fixed in the spiral flow path by the first grate, the second grate, and the cylindrical shell.

10. The reactor of claim 9, wherein the catalyst comprises solid spheres.

11. The reactor of claim 10, further comprising:

an input plenum coupled to the first end of the cylindrical shell via the first grate; and an output plenum coupled to the second end of the cylindrical shell via the second grate.

12. The reactor of claim 9, further comprising:

a first maintenance port on the cylindrical shell and coupled to the spiral flow path near the first end of the cylindrical shell; and a second maintenance port on the cylindrical shell and coupled to the spiral flow path near the second end of the cylindrical shell, wherein the first maintenance port and the second maintenance port are configured to be closed during operation of the reactor.

13. The reactor of claim 9, further comprising:

a coolant jacket plated around a portion of the cylindrical shell.

14. The reactor of claim 9, wherein the helix is configured to rotate within the cylindrical shell and around the central cylinder.

* * * * *